(12) United States Patent
Majmundar et al.

(10) Patent No.: US 8,510,801 B2
(45) Date of Patent: *Aug. 13, 2013

(54) MANAGEMENT OF ACCESS TO SERVICE IN AN ACCESS POINT

(75) Inventors: Milap Majmundar, Austin, TX (US); Randolph Wohlert, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 820 days.

This patent is subject to a terminal disclaimer.

(21) Appl. No.: 12/579,957

(22) Filed: Oct. 15, 2009

(65) Prior Publication Data

US 2011/0093913 A1  Apr. 21, 2011

(51) Int. Cl.
*G06F 7/04* (2006.01)
(52) U.S. Cl.
USPC ....... 726/3; 726/5; 726/15; 709/227; 709/229
(58) Field of Classification Search
None
See application file for complete search history.

(56) References Cited

U.S. PATENT DOCUMENTS

| | | | |
|---|---|---|---|
| 5,745,559 A | 4/1998 | Weir | |
| 5,864,764 A | 1/1999 | Thro et al. | |
| 6,052,594 A | 4/2000 | Chuang et al. | |
| 6,151,505 A | 11/2000 | Larkins | |
| 6,208,659 B1 | 3/2001 | Govindarajan et al. | |
| 6,219,786 B1 | 4/2001 | Cunningham et al. | |
| 6,256,504 B1 | 7/2001 | Tell et al. | |
| 6,266,537 B1 | 7/2001 | Kashitani et al. | |
| 6,363,261 B1 | 3/2002 | Raghavan | |
| 6,483,852 B1 | 11/2002 | Jacquet et al. | |
| 6,484,096 B2 | 11/2002 | Wong | |
| 6,512,478 B1 | 1/2003 | Chien | |
| 6,710,651 B2 | 3/2004 | Forrester | |
| 6,718,023 B1 | 4/2004 | Zolotov | |
| 7,080,139 B1 | 7/2006 | Briggs et al. | |
| 7,142,861 B2 | 11/2006 | Murai | |

(Continued)

FOREIGN PATENT DOCUMENTS

| | | |
|---|---|---|
| CN | 101017554 A | 8/2007 |
| CN | 101175333 A | 5/2008 |

(Continued)

OTHER PUBLICATIONS

Kaul. "Verizon's $250 femto box—A deliberate ploy behind the aggressive pricing?". Posted Tue, Jan. 20, 2009 13:19:46 EST. Last viewed Sep. 11, 2009. 1 pg.

(Continued)

*Primary Examiner* — Pramila Parthasarathy
(74) *Attorney, Agent, or Firm* — Turocy & Watson, LLP

(57) ABSTRACT

System(s) and method(s) are provided to configure access rights to wireless resources and telecommunication service(s) supplied through a set of access points (APs). Access to wireless resources is authorized by access attributes in access control list(s) (ACL(s)) while a profile of service attributes linked to the ACL(s) regulate provision of telecommunication service(s). Access and service attributes can be automatically or dynamically configured, at least in part, in response to changes in data that directly or indirectly affects an operation environment in which the set of APs is deployed. Automatic or dynamic configuration of access or service attributes enable control or coordination of wireless service provided through the set of APs; degree of control or coordination is determined at least in part by enablement or disablement of disparate services for disparate devices at disparate access points at disparate times and with disparate service priority.

22 Claims, 18 Drawing Sheets

(56) References Cited

U.S. PATENT DOCUMENTS

| | | |
|---|---|---|
| 7,146,153 B2 | 12/2006 | Russell |
| 7,209,739 B1 | 4/2007 | Narayanabhatla |
| 7,277,410 B2 | 10/2007 | Horneman |
| 7,317,931 B2 | 1/2008 | Guo |
| 7,370,356 B1 | 5/2008 | Guo |
| 7,437,755 B2 * | 10/2008 | Farino et al. ............... 726/5 |
| 7,493,390 B2 | 2/2009 | Bobde et al. |
| 7,496,383 B2 | 2/2009 | Kurata |
| 7,516,219 B2 | 4/2009 | Moghaddam et al. |
| 7,613,444 B2 | 11/2009 | Lindqvist et al. |
| 7,614,078 B1 | 11/2009 | Stieglitz et al. |
| 7,623,857 B1 | 11/2009 | O'Neil |
| 7,633,910 B2 | 12/2009 | Zhun et al. |
| 7,751,826 B2 | 7/2010 | Gardner |
| 7,761,526 B2 | 7/2010 | Pounds et al. |
| 7,768,983 B2 | 8/2010 | Nylander et al. |
| 7,853,265 B1 | 12/2010 | Ahmad et al. |
| 7,885,644 B2 | 2/2011 | Gallagher et al. |
| 7,929,537 B2 | 4/2011 | Vasudevan et al. |
| 7,929,970 B1 | 4/2011 | Gunasekara |
| 7,941,144 B2 | 5/2011 | Nylander et al. |
| 7,995,994 B2 | 8/2011 | Khetawat et al. |
| 8,064,909 B2 | 11/2011 | Spinelli et al. |
| 8,108,923 B1 | 1/2012 | Satish et al. |
| 2002/0098837 A1 | 7/2002 | Ferrario et al. |
| 2002/0123365 A1 | 9/2002 | Thorson |
| 2002/0142791 A1 | 10/2002 | Chen et al. |
| 2003/0028621 A1 | 2/2003 | Furlong et al. |
| 2003/0109271 A1 | 6/2003 | Lewis et al. |
| 2003/0125044 A1 | 7/2003 | Deloach |
| 2003/0139180 A1 | 7/2003 | McIntosh et al. |
| 2003/0142637 A1 | 7/2003 | Khawer et al. |
| 2003/0144793 A1 | 7/2003 | Melaku et al. |
| 2003/0153302 A1 | 8/2003 | Lewis et al. |
| 2004/0111382 A1 | 6/2004 | Haji-Ioannou |
| 2004/0125781 A1 | 7/2004 | Walter et al. |
| 2004/0203846 A1 | 10/2004 | Caronni et al. |
| 2004/0236702 A1 | 11/2004 | Fink et al. |
| 2004/0258003 A1 | 12/2004 | Kotot et al. |
| 2005/0003797 A1 | 1/2005 | Baldwin |
| 2005/0009499 A1 | 1/2005 | Koster |
| 2005/0026650 A1 | 2/2005 | Russell |
| 2005/0075114 A1 | 4/2005 | Dennison et al. |
| 2005/0108529 A1 | 5/2005 | Juneau |
| 2005/0144279 A1 | 6/2005 | Wexelblat |
| 2005/0160276 A1 | 7/2005 | Braun et al. |
| 2005/0172148 A1 | 8/2005 | Ying |
| 2005/0177645 A1 | 8/2005 | Dowling et al. |
| 2005/0223389 A1 | 10/2005 | Klein et al. |
| 2005/0250527 A1 | 11/2005 | Jugl |
| 2005/0254451 A1 | 11/2005 | Grosbach |
| 2005/0269402 A1 | 12/2005 | Spitzer et al. |
| 2006/0031387 A1 | 2/2006 | Hamzeh et al. |
| 2006/0031493 A1 | 2/2006 | Cugi |
| 2006/0046647 A1 | 3/2006 | Parikh et al. |
| 2006/0074814 A1 | 4/2006 | Lovell et al. |
| 2006/0075098 A1 | 4/2006 | Becker et al. |
| 2006/0182074 A1 | 8/2006 | Kubler et al. |
| 2006/0223498 A1 | 10/2006 | Gallagher et al. |
| 2006/0281457 A1 | 12/2006 | Huotari et al. |
| 2007/0002844 A1 | 1/2007 | Ali |
| 2007/0008894 A1 | 1/2007 | Lynch et al. |
| 2007/0025245 A1 | 2/2007 | Porras et al. |
| 2007/0032225 A1 | 2/2007 | Konicek et al. |
| 2007/0032269 A1 | 2/2007 | Shostak |
| 2007/0074272 A1 | 3/2007 | Watanabe |
| 2007/0094601 A1 | 4/2007 | Greenberg et al. |
| 2007/0097093 A1 | 5/2007 | Ohshita et al. |
| 2007/0097939 A1 | 5/2007 | Nylander et al. |
| 2007/0097983 A1 | 5/2007 | Nylander et al. |
| 2007/0099561 A1 | 5/2007 | Voss |
| 2007/0111706 A1 | 5/2007 | Kumar et al. |
| 2007/0123253 A1 | 5/2007 | Simongini et al. |
| 2007/0124802 A1 | 5/2007 | Anton et al. |
| 2007/0133563 A1 | 6/2007 | Hundscheidt et al. |
| 2007/0155421 A1 | 7/2007 | Alberth et al. |
| 2007/0167175 A1 | 7/2007 | Wong |
| 2007/0183427 A1 | 8/2007 | Nylander et al. |
| 2007/0184815 A1 | 8/2007 | Aebi |
| 2007/0199076 A1 | 8/2007 | Rensin et al. |
| 2007/0220252 A1 | 9/2007 | Sinko et al. |
| 2007/0232332 A1 | 10/2007 | Holur et al. |
| 2007/0258418 A1 | 11/2007 | Wurtenberger et al. |
| 2007/0270152 A1 | 11/2007 | Nylander et al. |
| 2007/0275739 A1 | 11/2007 | Blackburn |
| 2007/0287501 A1 | 12/2007 | Hoshina |
| 2008/0043972 A1 | 2/2008 | Ruetschi et al. |
| 2008/0049702 A1 | 2/2008 | Meylan et al. |
| 2008/0065752 A1 | 3/2008 | Ch'ng et al. |
| 2008/0076392 A1 | 3/2008 | Khetawat et al. |
| 2008/0076393 A1 | 3/2008 | Khetawat et al. |
| 2008/0076398 A1 | 3/2008 | Mate et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0081636 A1 | 4/2008 | Nylander et al. |
| 2008/0082538 A1 | 4/2008 | Meijer et al. |
| 2008/0119160 A1 | 5/2008 | Andriantsiferana et al. |
| 2008/0126531 A1 | 5/2008 | Setia et al. |
| 2008/0132239 A1 | 6/2008 | Khetawat et al. |
| 2008/0133742 A1 | 6/2008 | Southiere et al. |
| 2008/0151807 A1 | 6/2008 | Meier et al. |
| 2008/0168099 A1 | 7/2008 | Skaf |
| 2008/0181184 A1 | 7/2008 | Kezys |
| 2008/0207170 A1 | 8/2008 | Khetawat et al. |
| 2008/0242280 A1 | 10/2008 | Shapiro et al. |
| 2008/0244148 A1 | 10/2008 | Nix et al. |
| 2008/0254792 A1 | 10/2008 | Ch'ng |
| 2008/0261602 A1 | 10/2008 | Livneh et al. |
| 2008/0281687 A1 | 11/2008 | Hurwitz et al. |
| 2008/0282327 A1 | 11/2008 | Winget et al. |
| 2008/0299984 A1 | 12/2008 | Shimomura |
| 2008/0299992 A1 | 12/2008 | Eitan et al. |
| 2008/0305792 A1 | 12/2008 | Khetawat et al. |
| 2008/0305801 A1 | 12/2008 | Burgess et al. |
| 2008/0305834 A1 | 12/2008 | Janiszewski et al. |
| 2008/0318551 A1 | 12/2008 | Palamara et al. |
| 2009/0012898 A1 | 1/2009 | Sharma et al. |
| 2009/0031006 A1 | 1/2009 | Johnson et al. |
| 2009/0037973 A1 | 2/2009 | Gustave et al. |
| 2009/0042593 A1 | 2/2009 | Yavuz et al. |
| 2009/0046665 A1 | 2/2009 | Robson et al. |
| 2009/0047945 A1 | 2/2009 | Zhang |
| 2009/0059822 A1 | 3/2009 | Morrill et al. |
| 2009/0061821 A1 | 3/2009 | Chen et al. |
| 2009/0061873 A1 | 3/2009 | Bao et al. |
| 2009/0082010 A1 | 3/2009 | Lee |
| 2009/0082020 A1 | 3/2009 | Ch'ng et al. |
| 2009/0092096 A1 | 4/2009 | Czaja |
| 2009/0092097 A1 | 4/2009 | Nylander et al. |
| 2009/0093232 A1 | 4/2009 | Gupta et al. |
| 2009/0094351 A1 | 4/2009 | Gupta et al. |
| 2009/0094680 A1 | 4/2009 | Gupta et al. |
| 2009/0097436 A1 | 4/2009 | Vasudevan et al. |
| 2009/0111499 A1 | 4/2009 | Bosch |
| 2009/0122773 A1 | 5/2009 | Gogic |
| 2009/0124262 A1 | 5/2009 | Vela et al. |
| 2009/0129336 A1 | 5/2009 | Osborn et al. |
| 2009/0129350 A1 | 5/2009 | Khandekar et al. |
| 2009/0131050 A1 | 5/2009 | Osborn |
| 2009/0131098 A1 | 5/2009 | Khandekar et al. |
| 2009/0135749 A1 | 5/2009 | Yang |
| 2009/0135794 A1 | 5/2009 | Su et al. |
| 2009/0156213 A1 | 6/2009 | Spinelli et al. |
| 2009/0163216 A1 | 6/2009 | Hoang et al. |
| 2009/0163224 A1 | 6/2009 | Dean |
| 2009/0164547 A1 | 6/2009 | Ch'ng et al. |
| 2009/0170440 A1 | 7/2009 | Eyuboglu et al. |
| 2009/0170528 A1 | 7/2009 | Bull et al. |
| 2009/0180428 A1 | 7/2009 | Viswanath |
| 2009/0191844 A1 | 7/2009 | Morgan et al. |
| 2009/0191845 A1 | 7/2009 | Morgan et al. |
| 2009/0210324 A1 | 8/2009 | Bhogal |

| | | | |
|---|---|---|---|
| 2009/0213825 | A1 | 8/2009 | Gupta et al. |
| 2009/0215429 | A1 | 8/2009 | Caldwell et al. |
| 2009/0215452 | A1 | 8/2009 | Balasubramanian et al. |
| 2009/0221303 | A1 | 9/2009 | Soliman |
| 2009/0233574 | A1 | 9/2009 | Shinozaki |
| 2009/0245176 | A1 | 10/2009 | Balasubramanian et al. |
| 2009/0253421 | A1 | 10/2009 | Camp et al. |
| 2009/0253432 | A1 | 10/2009 | Willey et al. |
| 2009/0279701 | A1 | 11/2009 | Moisand et al. |
| 2009/0291667 | A1 | 11/2009 | Vakil et al. |
| 2009/0325634 | A1 | 12/2009 | Bienas et al. |
| 2010/0022266 | A1 | 1/2010 | Villier |
| 2010/0040026 | A1 | 2/2010 | Melkesetian |
| 2010/0048165 | A1 | 2/2010 | Caldwell et al. |
| 2010/0113067 | A1 | 5/2010 | Fullam et al. |
| 2010/0260068 | A1 | 10/2010 | Bhatt et al. |
| 2011/0177794 | A1 | 7/2011 | Nylander et al. |
| 2011/0200022 | A1 | 8/2011 | Annamalai |
| 2011/0280154 | A1 | 11/2011 | Silverstrim et al. |

FOREIGN PATENT DOCUMENTS

| | | | |
|---|---|---|---|
| GB | 2425291 | A | 10/2006 |
| GB | 2425921 | A | 11/2006 |
| JP | 2003288521 | | 10/2003 |
| JP | 2005073147 | | 3/2005 |
| JP | 2006067143 | | 3/2006 |
| JP | 2008048055 | | 2/2008 |
| WO | 2005076964 | A2 | 8/2005 |
| WO | 2007015067 | A2 | 2/2007 |
| WO | 2007040449 | A1 | 4/2007 |
| WO | 2008047039 | A1 | 4/2008 |

OTHER PUBLICATIONS

OA dated Jun. 17, 2010 for U.S. Appl. No. 11/457,129, 15 pages.
OA dated Oct. 24, 2011 for U.S. Appl. No. 12/275,925, 14 pages.
OA dated Nov. 30, 2011 for U.S. Appl. No. 12/275,878, 38 pages.
OA dated Dec. 1, 2011 for U.S. Appl. No. 12/275,996, 44 pages.
OA dated Oct. 25, 2011 for U.S. Appl. No. 12/465,580, 39 pages.
OA dated Nov. 8, 2011 for U.S. Appl. No. 12/465,468, 50 pages.
OA dated Jan. 5, 2012 for U.S. Appl. No. 12/465,585, 43 pages.
OA dated Dec. 28, 2011 for U.S. Appl. No. 12/175,293, 38 pages.
OA dated Nov. 21, 2011 for U.S. Appl. No. 12/484,026, 37 pages.
OA dated Dec. 14, 2011 for U.S. Appl. No. 12/484,072, 44 pages.
OA dated Nov. 1, 2011 for U.S. Appl. No. 12/816,087, 33 pages.
International Search Report and Written Opinion mailed Feb. 23, 2010, for PCT Application No. PCT/US2009/043846, 13 pages.
OA dated Dec. 31, 2009 for U.S. Appl. No. 11/457,129, 16 pages.
OA dated Apr. 17, 2009 for U.S. Appl. No. 11/276,269, 15 pages.
OA dated Nov. 4, 2008 for U.S. Appl. No. 11/276,269, 15 pages.
International Search Report and Written Opinion dated Oct. 27, 2009 for PCT Application Serial No. PCT/US2009/043861, 14 pages.
OA dated Mar. 5, 2012 for U.S. Appl. No. 12/465,598, 55 pages.
OA dated Mar. 19, 2012 for U.S. Appl. No. 12/276,120, 68 pages.
OA dated Mar. 30, 2012 for U.S. Appl. No. 12/484,026, 30 pages.
Notice of Allowance dated Apr. 3, 2012 for U.S. Appl. No. 12/275,996, 38 pages.
OA dated Apr. 10, 2012 for U.S. Appl. No. 12/275,416, 32 pages.
OA dated Apr. 10, 2012 for U.S. Appl. No. 12/484,135, 45 pages.
OA dated Apr. 13, 2012 for U.S. Appl. No. 13/316,106, 35 pages.
Notice of Allowance dated Apr. 25, 2012 for U.S. Appl. No. 12/465,468, 35 pages.
OA dated May 8, 2012 for U.S. Appl. No. 11/457,129, 38 pages.
OA dated Mar. 29, 2011 for U.S. Appl. No. 12/276,002, 37 pages.
OA dated Apr. 13, 2011 for U.S. Appl. No. 12/276,058, 40 pages.
OA dated Apr. 19, 2011 for U.S. Appl. No. 12/276,238, 22 pages.
OA dated May 5, 2011 for U.S. Appl. No. 12/275,015, 32 pages.
OA dated Mar. 15, 2011 for U.S. Appl. No. 12/206,774, 14 pages.
OA dated Aug. 18, 2011 for U.S. Appl. No. 12/275,416, 39 pages.
OA dated Sep. 14, 2011 for U.S. Appl. No. 12/276,002, 35 pages.
OA dated Oct. 5, 2011 for U.S. Appl. No. 12/276,058, 37 pages.
OA dated Oct. 6, 2011 for U.S. Appl. No. 12/465,483, 50 pages.
OA dated Oct. 4, 2011 for U.S. Appl. No. 12/484,135, 44 pages.
OA dated Jul. 21, 2011 for U.S. Appl. No. 12/175,293, 30 pages.
OA dated Aug. 23, 2011 for U.S. Appl. No. 12/206,774, 15 pages.
OA dated Aug. 23, 2011 for U.S. Appl. No. 12/334,353, 23 pages.
OA dated Jun. 14, 2011 for U.S. Appl. No. 12/275,878, 35 pages.
OA dated Jun. 22, 2011 for U.S. Appl. No. 12/484,072, 38 pages.
OA dated Jul. 7, 2011 for U.S. Appl. No. 12/276,257, 24 pages.
OA dated Jun. 28, 2011 for U.S. Appl. No. 12/275,925, 18 pages.
OA dated Jun. 8, 2011 for U.S. Appl. No. 12/484,026, 30 pages.
OA dated Oct. 2, 2012 for U.S. Appl. No. 12/484,026, 29 pages.
OA dated Oct. 11, 2012 for U.S. Appl. No. 13/487,794, 45 pages.
OA dated Oct. 9, 2012 for U.S. Appl. No. 13/298,924, 51 pages.
OA dated Nov. 1, 2012 for U.S. Appl. No. 12/276,058, 59 pages.
OA dated Nov. 5, 2012 for U.S. Appl. No. 12/484,072, 52 pages.
OA dated Nov. 20, 2012 for U.S. Appl. No. 12/275,878, 28 pages.
Japanese Office Action mailed Sep. 13, 2012 for Japanese Patent Application No. 2011-509669.
Canadian Office Action mailed Oct. 30, 2012 for Canadian Patent Application No. 2,722,324, 3 pages.
Japanese Office Action mailed Sep. 13, 2012 for Japanese Patent Application 2011-509675, 4 pages.
Office Action dated Dec. 3, 2012 for U.S. Appl. No. 12/275,416, 33 pages.
OA dated Jul. 16, 2012 for U.S. Appl. No. 12/275,878, 37 pages.
OA dated Jul. 10, 2012 for U.S. Appl. No. 12/465,585, 32 pages.
OA dated Sep. 5, 2012 for U.S. Appl. No. 12/276,120, 49 pages.
OA dated Aug. 16, 2012 for U.S. Appl. No. 12/465,598, 31 pages.
OA dated Sep. 10, 2012 for U.S. Appl. No. 12/276,002, 54 pages.
Office Action dated Jan. 17, 2013 for U.S. Appl. No. 13/554,710, 42 pages.
Office Action dated Feb. 26, 2013 for U.S. Appl. No. 12/276,120, 59 pages.
Chinese Office Action dated Feb. 16, 2013 for Chinese Application No. 200980117263.8, 7 pages.
Chinese Office Action dated Jan. 31, 2013 for Chinese Application No. 200980117188.5, 11 pages.
Office Action dated Mar. 14, 2013 for U.S. Appl. No. 12/484,072, 34 pages.
Office Action dated Apr. 23, 2013 for U.S. Appl. No. 12/175,293, 41 pages.

* cited by examiner

MANAGEMENT OF ACCESS TO SERVICE IN AN ACCESS POINT

TECHNICAL FIELD

The subject disclosure relates to wireless communications and, more particularly, to manipulating access rights to wireless resources and telecommunication service(s) supplied through a set of one or more indoor-based or outdoor-based access points.

BACKGROUND

Access to wireless resources and service through a base station is typically dictated by attachment procedures. Such procedures are generally effective in public networks in which access to base stations and wireless resources supplied there from is public or semi-public. However, for base stations, such as indoor-base stations, intended to provide wireless coverage to a limited number of devices, attachment procedures are supplemented with regulation protocols that include various credential-based access protocols; for example, password-protected logins are required to gain access to wireless resources and service. Such regulation protocols commonly entail configuration that requires human intervention, e.g., an administrator of a set of indoor-based base stations establishes credentials for a mobile device that is authorized to consume wireless service through the set of base stations. Such configuration generally demands additional human intervention to implement updates to access allowed to the mobile device. As wireless communications becomes pervasive, larger number of devices are utilized in larger and more complex networks of base stations and associated wireless environments. Thus management of access to wireless service based on manual configuration becomes less efficient and substantially unable to adjust to rapidly changing wireless environments with varying degrees of access rights and consumed wireless services.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. Its sole purpose is to present some concepts in a simplified form as a prelude to the more detailed description that is presented hereinafter.

One or more embodiments of the subject disclosure provide system(s) and method(s) that enable control and configuration access rights to wireless resources and telecommunication service(s) supplied through a set of access points (APs). Access to wireless resources is authorized by access attributes in access control list(s) (ACL(s)) while a profile of service attributes linked to the ACL(s) regulate provision of telecommunication service(s). Access and service attributes can be automatically or dynamically configured, at least in part, in response to changes in data that directly or indirectly affects an operation environment in which the set of APs is deployed. Automatic or dynamic configuration of access or service attributes enable control or coordination of wireless service provided through the set of APs; degree of control or coordination is determined at least in part by enablement or disablement of disparate services for disparate devices at disparate access points at disparate times and with disparate service priority.

Aspects, features, or advantages of the subject disclosure are network and radio technology agnostic, and can be exploited in substantially any network and through most any or any wireless communication technology. For example, Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all or all aspects of the subject disclosure can include legacy telecommunication technologies.

While various aspects, features, or advantages of the subject disclosure are illustrated through femtocell access point(s), such aspects and features also can be exploited in other types of indoor-based access points (e.g., home-based access point(s), enterprise-based access point(s)) that provide wireless coverage through substantially any or any disparate telecommunication technologies such as, but not limited to, Wi-Fi or picocell telecommunication. In addition, the aspects, features, or advantages disclosed herein can be exploited in macrocellular base stations.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

DETAILED DESCRIPTION

Figure 1:
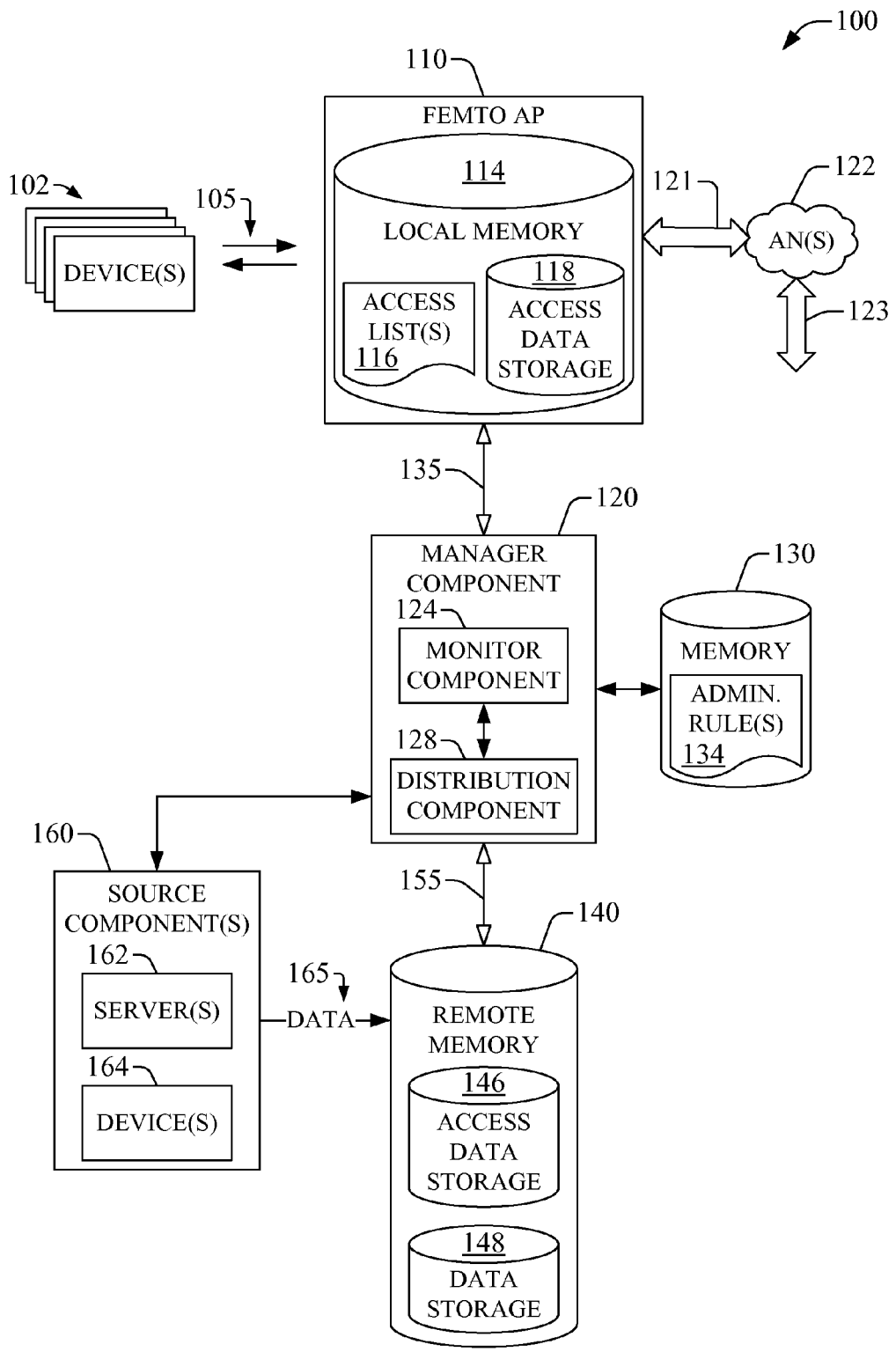
FIG. 1 is a block diagram of an example system that enables control of access and service attributes that regulate access to wireless resources and service in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the present disclosure. It may be evident, however, that the present innovation may be practiced without these specific details. In other instances, well-known structures and devices are shown in block diagram form in order to facilitate describing the present disclosure.

As employed in this specification and annexed drawings, the terms "component," "system," "platform," "interface," "node," "coder," "decoder" and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP);" "base station," "Node B;" "evolved Node B (eNode B);" "home Node B (HNB)" or "home access point (HAP)," which include femtocell access point, picocell access point, Wi-Fi base station . . . ; and the like, are utilized interchangeably in the subject application, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows. It is noted that context in the subject specification generally distinguishes among a base station that provides outdoor wireless coverage and a home access point (e.g., femtocell AP) that provides indoor wireless coverage; explicit distinction between indoor-serving AP and outdoor-serving base station is made when context may be insufficient to distinguish the utilized terms.

Furthermore, the terms "user," "subscriber," "customer," "consumer," and the like are employed interchangeably throughout the subject specification, unless context warrants particular distinction(s) among the terms. It should be appreciated that such terms can refer to human agents or automated components supported through artificial intelligence (e.g., a capacity to make inference based on complex mathematical formalisms) which can provide simulated vision, sound recognition and so forth.

Further yet, the term "set" as employed herein excludes the empty set. Thus, a "set" in the subject disclosure includes one or more elements or entities. As an illustration, a set of devices includes one or more devices; a set of access points includes K access points with K a natural number greater than or equal to unity; a set of attributes spans one or more attributes; etc.

As described in greater detail below, the subject disclosure provides system(s) and method(s) that enable control and configuration access rights to wireless resources and telecommunication service(s) supplied through a set of access points (APs). Access to wireless resources is authorized by access attributes in access control list(s) (ACL(s)) while a profile of service attributes linked to the ACL(s) regulate provision of telecommunication service(s). Access and service attributes can be automatically or dynamically configured, at least in part, in response to changes in data that directly or indirectly affects an operation environment in which the set of APs is deployed. Automatic or dynamic configuration of access or service attributes enable control or coordination of wireless service provided through the set of APs; degree of control or coordination is determined at least in part by enablement or disablement of disparate services for disparate devices at disparate access points at disparate times and with disparate service priority.

While aspects or features of the subject disclosure are illustrated in terms of applicability to femtocells access points, such aspects and features are also applicable to, and can be exploited in, other radio access points such as Wi-Fi APs, picocell base station, microcell base stations, or the like, which may provide greater radio access capacity.

It is noted that features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request(s) to a particular functional element (e.g., a femtocell AP) in order to execute specific operation(s). Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a light-payload file (e.g., a cookie), an email communication, an instant message, or the like. In addition, directive(s), request(s), indication(s), or the like, as described herein, can be delivered in accordance with various protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

With respect to the drawings, FIG. 1 is a block diagram of an example system 100 that enables is a block diagram of an example system that enables control of access and service attributes that regulate access to wireless resources and service in accordance with aspects described herein. Femtocell (femto) AP 110 can provide wireless service throughout a confined coverage area to a set of devices 102 via wireless links 105, and it is functionally coupled to manager component 120 via interface 135. In various deployment scenarios, femtocell AP 110 can be a mobile base station. Manager component 120 can control access and service attributes that regulate provision of wireless service through femto AP 110. In an aspect, interface 135 can be embodied in at least one of conventional link(s) (e.g., a fiber optic link, an Ethernet link, a T1/E1 line . . . ) or reference link(s) (e.g., Gi, Gn . . . ). Exchange of information, such as data or signaling, amongst femto AP 110 and manager component 120 can be effected through standard protocols or proprietary protocols. The standard protocols can include file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), Open Mobile Alliance (OMA) device management (DM) protocol, or the like.

The confined coverage area can include a residential dwelling, a business space, an entertainment area, a worship area, an educational facility, a wellness area, a hospital, etc., and access to wireless service is private and controlled in accordance with aspects described herein. However, it should be appreciated that wireless service also can be supplied in open or public mode, as described herein. To provide wireless service, femto AP 110 is linked to a femtocell network platform (femtocell gateway node(s), server(s), memory(ies), etc.) via backhaul link 121 and through a backhaul network that is part of access network(s) (AN(s)) 122, which accesses the femtocell network platform through link 123. In an aspect, backhaul link 121 can be embodied in one or more wired backbone network pipes such as an optical fiber backbone, a twisted-pair line, a T1/E1 phone line, a digital subscriber line (DSL) either synchronous or asynchronous, an asymmetric DSL, a coaxial cable, or the like. Backhaul link 121 also can include one or more wireless backbone link(s), e.g., a line-of-sight (LOS) or a non-LOS wireless link; LOS wireless link can include satellite wireless link(s). In UMTS-based radio technology, backhaul link 150 is embodied, at least in part, in Iuh interface.

Set of devices 102 can comprise one or more devices, mobile or otherwise, that utilize wireless network resources to telecommunicate voice or data. The number of devices in set 102 that are granted access to wireless service can be substantially greater than a few, e.g. tens or hundreds of mobile devices can be included in set 102. However, such a large set of mobile devices generally is not provided with access to wireless service simultaneously, with only a subset of devices in set 102 provided connectivity at a specific time. Number of devices supplied wireless service at the specific time can be established based at least in part on at least one of operational radio condition(s), e.g., capacity of radio coverage, or available backhaul resources such as capacity, available bandwidth, or the like.

Femto AP 110 includes local memory 114 that comprises data that control access to wireless resources and services provided as part of telecommunication through femto AP 110. Such data includes access control list(s) 116 and access data storage 118—in the subject specification and annexed drawings, access control list(s) 116 are also referred to as access list(s) 116. While illustrated as separate entities, it should be appreciated that data storage 118 can include access list(s) 116.

Access control list(s) (ACL(s)) 116 enable, at least in part, regulation of access to wireless service supplied through femto AP 110 and features of supplied wireless service. To at least that end, ACL(s) can comprise a set of access attributes, which identify devices that can communicate wirelessly and are authorized to receive telecommunication service through femto AP 110. An access attribute uniquely identifies a device. In an aspect, an access attribute can be one of an international mobile subscriber identity (IMSI), temporary IMSI (TIMSI), a mobile subscriber integrated services digital network (MSISDN), an international mobile equipment identifier (IMEI), a mobile directory number (MDN), a mobile identification number (MIN), a Telecommunications Industry Association (TIA) electronic serial number (ESN), or a multi-bit identification number like the mobile identity number (MEID). It should be appreciated that access attributes can be represented with other token(s) or code(s) that uniquely identify a device.

An access control list associated with a femtocell AP can enable regulation of access thereto in the following manner. If a femtocell AP, e.g., 110, receives attachment signaling (e.g., LAU signaling or RAU signaling in UMTS-based radio technology) originated by a device, e.g., a handset in set 102, the femtocell AP validates an identity of the device, as conveyed in the attachment signaling, against the access control list, e.g., ACL(s) 116, associated with the femtocell AP. If the identity of the device matches a device identifier in the ACL, the attachment procedure associated with received attachment signaling is completed and the femtocell AP allows the device to camp therein and establish call sessions normally. In the alternative, if validation against the ACL results in no match amongst the identity of the device and a device identity retained in the ACL, the femtocell AP rejects the attachment signaling and the device is allowed only to establish emergency calls.

An owner or lessee of a femtocell AP, e.g., femto AP 110, can determine access attributes to be recorded in or removed from an access control list, e.g., ACL(s) 116, associated with the femtocell AP. Recordation in or removal from an ACL can be performed automatically as described hereinafter. In an example scenario, management of a hotel that deploys one or more femtocell APs to enable communication for guests in locations where the radio signal for cellular phones is not strong (e.g., in the hotel's basement) can record identities of hotel guest's mobile devices in access control lists associated with the one or more femtocell APs. In another example scenario, administration of a cruise ship that deploys one or more femtocell APs therein can record identities of mobile devices of all passengers in ACLs associated with the one or more femtocell APs. In yet another example scenario, administration of an enterprise organization can record identities of devices of its employees in a set of ACLs to grant access to the organization's various femtocell APs associated with such set of ACLs; devices linked to general public are not recorded in the set of ACLs and thus excluded from wireless coverage. In a further example scenario, management of a transportation company can deploy femtocell APs within a train to provide wireless service to a highly dynamic mix of passengers that board the train; to that end, management can record identities of mobile devices of passengers in ACLs related to deployed femtocell APs. Such ACLs do not include identities of non-passenger's mobile devices that can operate near the train track, in adjacent buildings, roads, etc.; thus, the femtocell APs deployed in the train do not provide wireless service to those non-passenger mobile devices.

Likewise, an owner or lessee of a femtocell AP (e.g., femto AP 110) can configure, e.g., generate, populate, depopulate, access control list (e.g., ACL(s) 116) associated with the femtocell AP in accordance with access attributes determined by a different party. Configuration of ACL(s) can be performed automatically as described hereinafter. As an example, in the foregoing hotel scenario, an event (e.g., convention or wedding reception) can be held in an area of the hotel wherein wireless coverage can be provided to event participants through femtocell APs (e.g., the area includes convention meeting rooms in basement of hotel). The hotel can configure ACLs associated with the femtocell APs to include mobile device identifiers of registered event participants, wherein registration of participants is managed by organizers of the event (convention organizers, wedding planner(s), etc.) that are not affiliated with the hotel. Thus, registered event participants are automatically granted access to wireless coverage through the femtocell APs; access can be allowed through substantially the span of the event; e.g., from 2 hours before the start of the event (convention, wedding reception, etc.) until 2 hours after the close of the event.

More than one ACL can be retained in local memory 114; however, for a single femtocell AP, e.g., 110, a single ACL can be active at a time in order to regulate access and provide wireless services. In an aspect, femto AP 110 can include two ACLs: a first ACL includes at least one of access attributes or service attributes, and a second ACL that renders femto AP 110 public, e.g., any mobile device near femto AP 110 can attach thereto and receive wireless service. As an example, the second ACL can include a "public" logical variable that when configured to "True" condition, if the ACL is active and attachment signaling is received, allows femto AP 110 to proceed with attachment protocol(s) without discrimination based on device identity. Period(s) of public access, e.g., when the second ACL is active, can vary depending at least in part on at least one of the day of the week and the time of day. For example, an owner of lessee of femto AP 110 can allow public access to wireless service through the femto AP 110 from 11:00 p on a day to 5:00 a the next day. As a result of allowing public access to wireless service, the owner or lessee of femto AP 110 can receive compensation from a network operator that administers telecommunication service through femto AP 110. Alternatively or additionally, the second ACL can be part of a regulatory or operational framework that allows network operator(s) to configure femto AP 110 for public use in case of emergency such as natural disasters (hurricanes, fires, floods, etc.), terrorist attacks, or the like.

Access data storage 118 can retain service attributes that control logic for provision of service to a device identified in an ACL. Service attributes can be specific to a femtocell access point, such as illustrated femto AP 110, thus service attributes can enable location-based customization of provided service depending on the deployment location of the femtocell AP. The logic for provision of service can establish at least one of the following features: (1) Supplied service(s), e.g., voice-only service, data-only service and available applications, voice and data service and provided applications associated with the service(s). In addition, radio technology employed to supply service(s) also can be set. (2) Service priority, e.g., ranking of access to radio resources such as radio technology (3G or 4G), bandwidth, dedicated channels. (3) Access schedule or time constraints, such as time of day considerations, or expected duration of provided service—hotel stay, cruise tour, lecture or seminar allotted time, convention or conference program length, or the like. (4) Level of service or access quality of service, e.g., quality of service (QoS) profile such as best effort, conversational, real-time. It should be appreciated that service attributes also can determine other service features.

A configuration of service attributes, also referred to as a profile of service attributes or access profile, is specific to a mobile device identified in an access control list, even though it should be noted that a particular configuration of service attributes can display a one-to-many relationship with identified devices in an ACL. Accordingly, specification of a service attribute profile can customize provision of wireless service through a femtocell AP, e.g., 110. Generation or update of a profile of service attributes can be automated as described herein. In an aspect, devices that can access wireless service through a femtocell AP, e.g., devices in set 102, can be categorized in accordance with commercial value to a business entity that has a commercial relationship with subscribers linked to respective devices and that operates or manages a set of femtocell APs. A profile of service attributes for a device can be configured based at least in part on device's category, so that level of service is higher for higher categories. In a scenario in which a business entity that operates femto AP 110 is a cruise line company and femto AP 110 is deployed within an area of a cruise ship, devices linked to Economy class passengers can be supplied a limited amount of data connectivity, e.g., low priority, best effort QoS; devices linked to Business class passengers can be provided a predetermined amount of service units for data and speech (e.g., high priority, real-time connectivity); and First-class passengers can be supplied highest available connectivity for data and speech, such as unlimited service units (e.g., minutes, MBs) for data and voice traffic. It should be appreciated that categorization of devices that can access wireless service via femto AP 110, or any other femtocell AP described herein, can be based metrics other than commercial value; for instance, categorization can be based on demographics, longevity of commercial relationship, etc. As an illustration, a categorization not based on commercial value can distinguish employees from visitors of an enterprise business or factory that exploits femtocell APs, such as femto AP 110, to provide wireless service within one of its locations, e.g., plant floor, administrative offices. Service attributes can be configured to provide visitors with disparate levels of access to telecommunication service through the femtocell APs, e.g., femto AP 110. The level of access can be constrained with respect to level of access afforded to employees, and can be determined according to the visitor; e.g., a salesperson can receive more constrained access to wireless service than a technician that visits the factory to repair equipment. In another related aspect, service attributes that control supplied service also can be configured on category of a device that can access wireless service: For example, First-class passengers can receive unlimited access, via a femtocell AP, e.g., 110, to all or substantially all services provided locally within the coverage are of the femtocell AP and that do not relay on backhaul delivery at any time; Business class passengers can be supplied with selected services such as on-demand, purchased entertainment (music, movies, etc.) from media server(s) local to the coverage area, and be allowed access to local server-based multi-user online games; while Economy class passengers can be supplied access to locally cached news, weather information, the cruise ship's event planning calendar, etc. It should be appreciated the higher categories also can access services provided to lower categories. In yet another related aspect, service attributes can determine disparate service priorities for devices in disparate categories or segments: For instance, in the hotel scenario indicated supra, devices of hotel guests (first segment) can be provided wireless service with higher priority than non-guest participants (second segment) in an event, e.g., a convention, that takes place at the hotel.

In another aspect, time constraints can be considered to balance load associated with provision of service: For example, a set of devices (e.g., devices linked to Economy class passengers in cruise ship) can be provided higher wireless resources, such as bandwidth, in off-peak hours than in periods of heavier wireless service utilization. In another related aspect, time constraints as conveyed by service attributes can ensure telecommunication service provided through a femtocell AP remains non-public: As an example, devices of guests of a hotel can access femto AP 110 for the duration of their stay in the hotel.

Additionally, traffic condition(s) related to provision of wireless service can be controlled, at least in part, through dynamic adjustment of one or more profiles of service attributes; for instance traffic shaping can be effected through dynamic reconfiguration of service priority of a group of served devices. As an example, in times of access congestion, manager component 120 can configure service attributes of served high-value subscribers (e.g., first-class passengers in cruise ship) so that traffic associated therewith can take precedence over traffic associated with lower value subscribers (e.g., Economy class passengers in a cruise ship).

In an aspect, a "universal" predetermined profile of service attributes can be associated with each device identified in an ACL. Universal profile can be suitable for a coverage area in which the set of devices 102 is highly dynamic and changes substantially, e.g., the coverage area can be a train cart, a subway cart, an elevator, or the like. In such coverage area, handoff from femtocell-based wireless coverage to macrocellular coverage or a disparate indoor-based coverage is highly likely; thus, the universal profile can ensure that call sessions are retained without substantive or unnecessary service customization. As an example, a universal profile can allow provision of voice-only service within 2.5G radio technology with a pre-determined allocated bandwidth on a 24-hour service cycle (e.g., daily access).

Service attributes retained in access data storage 118 and associated with ACL(s) 116 can reduce signaling associated with configuration of an access control list, e.g., addition or removal of device identifier(s). For example, service attributes in access data storage 118 can include a set of schedules, or a calendar, associated with activities, social or otherwise, that occur in the coverage area of femto AP 110: (i) On Tuesday nights, an owner or lessee of femto AP 110 hosts a poker club for a group of friends or acquaintances. (ii) On the first Thursday night of every month, spouse of the owner or lessee of femto AP 110 hosts reading and discussion session(s), e.g., Oprah's book review. (iii) On every other Saturday morning, gardening club meets at the house of the owner or lessee, the house embodies coverage area of femto AP 110. (iv) On Saturday nights, relatives visit the house of the owner or lessee for family event(s) such as dinner. (v) On Sundays, friends or acquaintances of the owner or lessee of femto AP 110 attend sport broadcast sessions at the house of the owner or lessee of femto AP 110. Schedules (i)-(v) determine time intervals during which a mobile device (e.g., a device in set 102) of a participant in the scheduled activities that enters coverage area of femto AP 110 can be included in ACL(s) 116 in response to mobile device's attachment attempt that results from entrance into femtocell coverage area. Accordingly, the participant's mobile device is automatically provided with access to wireless service through femto AP 110 during the period set by a suitable schedule. Features of the provisioned wireless service can be determined by service attributes in access profiles associated with respective schedules. As conveyed in the subject example, access to service is supplied in accordance with the scheduled periods without removal of an identified mobile device from ACL(s) 116, which reduces signaling associated with deletion of included mobile device identifier(s).

To implement, at least in part, control of access rights to wireless resources and telecommunication service(s) supplied through femtocell AP 110, or any other femtocell AP described herein, manager component 120 can automatically generate access control list(s) (e.g., ACL(s) 116) and configure access attributes therein; e.g., include or exclude a mobile device identifier (e.g., IMSI) in the generated ACL(s). In addition or in the alternative, manager component 120 can automatically configure, e.g., add, remove, or modify, service attributes associated with available ACL(s) that can be generated by either manager component 120 or other component(s) or functional element(s). In an aspect of the subject disclosure, manager component 120 can automatically (e.g., without human intervention) configure access attributes or service attributes based at least in part on at least one of reference data, update(s) to reference data or administration rule(s). At least a portion of such administration rule(s), which can be retained in memory element 134, are specific to operation environment in which a femtocell AP, e.g., femto AP 110 or any femtocell AP described herein, is deployed.

Reference data is data that directly or indirectly affect wireless service provided by one or more femtocell APs, e.g., femto AP 110, in the coverage area(s) associated with the one or more femtocell APs. At least a portion of reference data can comprise data that enables provision of wireless service access to a femtocell AP, e.g., femto AP 110, the access data can be retained in memory element 146 and can comprise mobile device identity(ies) (e.g., MSISDN), available services or related applications, QoS profiles, schedule(s) or calendar(s), service priorities, or the like. At least a portion of reference data can be retained in a remote memory 140, within data storage 148, and at least a portion of the reference data can be produced by source component(s) 160, which can deliver data 165 to data storage to be retained as reference data. Server(s) 162 can be specific to the operational environment in which femtocell AP 110, or any femtocell AP described herein, is deployed. In addition, server(s) 162 can include database management component that administer, at least in part, data retained in remote memory 140. As an example, if the operation environment is a hotel, server(s) 162 can control at least one of hotel guest list(s); schedule of events such as conventions, wedding receptions, book signing, press conferences . . . ; information related to guest(s) such as billing records (e.g., credit card information), accommodation arrangements (e.g., room type) or preferences (breakfast time and content, preferred newspaper, parking arrangements, etc.); or the like. As another example, if the operation environment is related to transportation, server(s) 162 can control at least one of (i) ticket registration information such as sales, returns, changes; (ii) transportation schedules including departure times, boarding times, arrival times; (iii) location information such as data on arrival/departure gate(s) or platform(s); (iv) presence information as mobile devices of travelers are detected, e.g., by devices 164, to be in boarding or arrival areas; (v) passenger or traveler information; or the like. In yet another example, if operation environment is an enterprise location, server(s) 162 can manage at least one of human resources data such as employee listings, employee location, employee associates, employee affiliation within organization; employee clearances to specific locations within enterprise, employee terms of employment . . . ; visitor records including visit schedule, intended location of visit, etc. In an aspect of the subject disclosure, the foregoing exemplified data is reference data and can be conveyed or retained in data storage 148.

Manager component 120 can communicate with remote memory 140 and access, e.g., monitor or collect, reference data therein through interface 155 in accordance with standardized or proprietary protocols. Remote memory 140 can be part of a dedicated component, e.g., such as a database server, which can be embodied in a computer, a dedicated file server, or a communications network application server.

Reference data retained in data storage 148 can be updated based on at least one of an event, a time, or a location; event, time, and location are specific to operation environment in which a femtocell AP, e.g., 110, is deployed. Records and changes thereof associated with event-based updated to reference data can be retained in one or more server(s) 162. Event-based updates to reference data can include check-in or check-out instances in a hotel and associated a modification to the hotel guest list; alteration to roster of employees (e.g., inclusion or removal of contractors, temporary employee, or addition or termination or regular employees . . . ) of a business and related update to human resources records; registration of a visitor to a factory and modification of visitor log; initiation or termination of a cruise trip; entrance to or exit from a transportation vehicle (train, maritime vessel, subway, elevator, etc.) that includes a femtocell AP; admission to participate in a convention and related change to a listing of registered participants; or the like. Time-based updates to reference data can be dictated by a schedule(s) associated with aspects of the operation environment: As an example, a factory shift can determine a time constraint that results in update to a list of active employees and thus alteration of listing of mobile device authorized to access wireless service. As another example, commencement and termination time of a convention can result in inclusion and removal, respectively, of a list of convention participants and mobile devices linked therewith. Location-based updates to reference data can include presence information related to mobile devices that ingress and area (e.g., board a train) or egress an area (e.g., disembark the train) with wireless coverage supplied through a femtocell AP; or location data, or fixes, communicated by a mobile device that can communicate in the operation environment.

Manager component 120 can monitor reference data or updates thereto and can process such reference data or updates thereto in order to configure automatically (e.g., without human intervention) at least one of access attributes or a set of service attributes or profile(s) of service attributes associated with one or more access attributes. It should be appreciated that an processing of reference data results in reference data. The automatic configuration is based at least in part on updated reference data or processed reference data. Extent of monitored reference data can, at least in part, be defined by administration rule(s). In an aspect, administration rule(s) can indicate a set of data types or a data structures (e.g., employee record, visitor record, passenger record, presence records . . . ) to be monitored. The administration rule(s) also can establish a logical location or address in which data is to be monitored; e.g., a URI, name, or internet protocol (IP) address of a server such as hotel guest data server, a web server that maintains a convention web portal and convention participant data, or the like. In addition, administration rule(s) also can dictate manipulation, or processing, of monitored or collected reference data. For instance, the administration rule(s) can establish an operation to be performed on or amongst one or more fields in a data structure associated with monitored reference data or information related to the data structure. Administration rule(s) can be retained in memory 130, within memory element 134; memory 130 functionally coupled to manager component 130 or integrated therein.

Manager component 120 also can monitor operation conditions of a femtocell AP, e.g., femto AP 110 or any other femtocell AP described herein. The operation conditions can include load conditions (e.g., level of traffic congestion, rise-over-thermal . . . ) of the femtocell AP or regions served thereby. Based on monitored operation conditions, manager component 120 can configure at least one of access attribute(s) or service attribute(s) to control operation conditions.

Manager component 120 can include a monitor component 124 that tracks updates to reference data. Monitor component 120 also can track operation condition(s) of one or more femtocell APs. In an aspect, to track such updates, monitor component 124 can poll data retained in remote memory 140 to detect updates; polling can be conducted periodically or in accordance with a polling schedule. Polling period $\tau$, or rate $\tau^{-1}$, is configurable and can be part of administration rules(s) 134. An administrator of manager component 120, wherein the manager is a human agent or a component, can configure polling rate. Similarly, the polling schedule can be configurable and retained as part of administration rule(s) 134. In another aspect, monitor component 120 can receive indication(s), e.g., notification(s), of update(s) to reference data; the indication(s) are receive automatically and can be provided by a component (e.g., server(s) 162) that manages or controls data retained in remote memory 140; to receive such notification(s), monitor component 120 can subscribe to an update notification service provided by the component.

Manager component 120 also can include a distribution component 128 that can process reference data and supply access and service attributes to local memory, e.g., 114, in a femtocell access point, such as femto AP 110. In an aspect, as part of provision of access attributes, distribution component 128 can configure, e.g., add, remove, or edit, access attributes in one or more access control list, e.g., ACL(s) 116, in a femtocell AP; such configuration can be automatic and based at least in part on administration rule(s) 134. Access and service attributes can be part of access data storage 146 and can be supplied in accordance, at least in part, with administration rule(s) 134.

Figure 2:
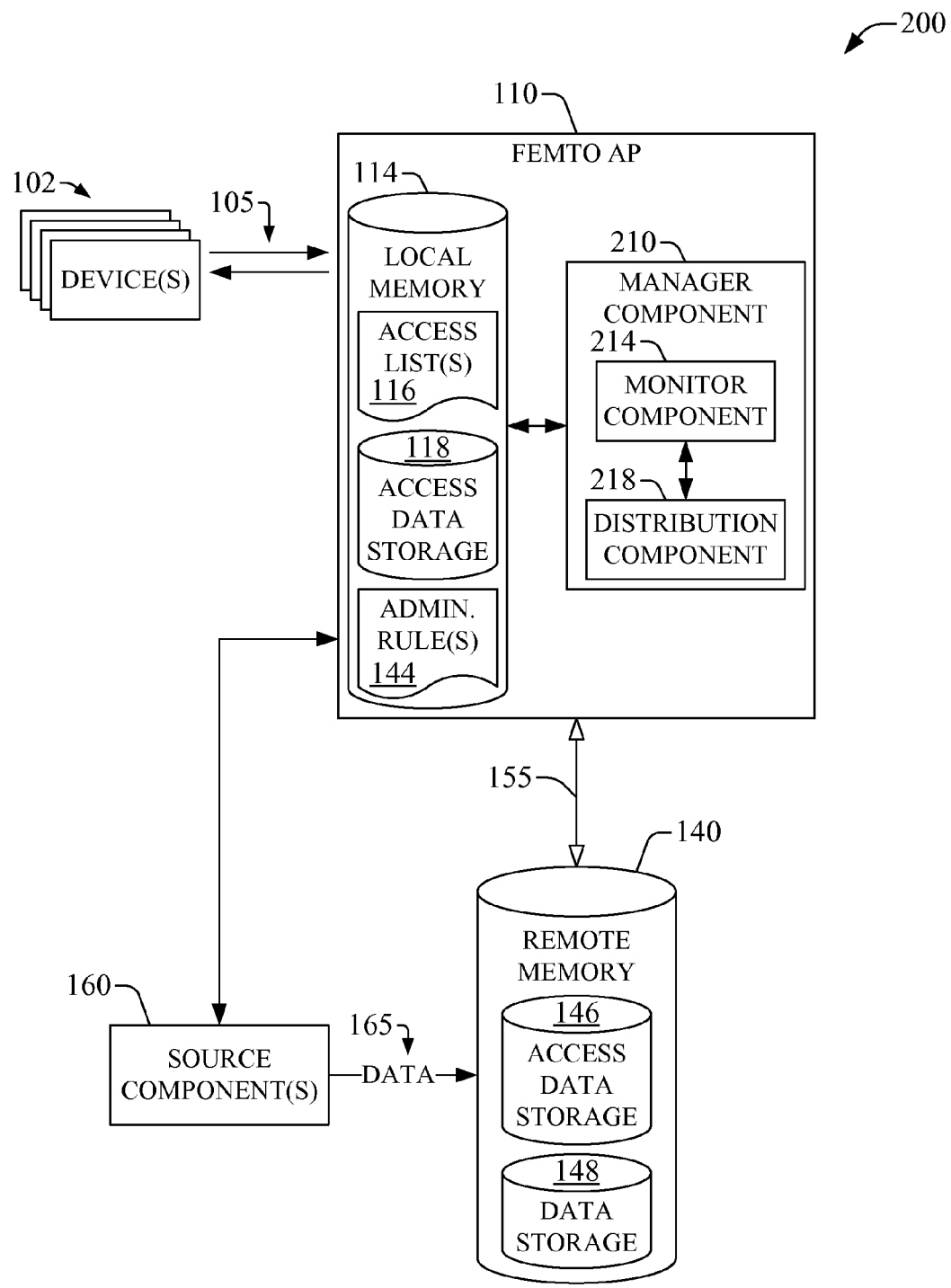
FIG. 2 is a block diagram of an example embodiment of example system disclosed in FIG. 1 in accordance with aspects described herein.

In one or more embodiments, e.g., example embodiment 200 displayed in FIG. 2, manager component 120 and described functionality thereof can be included within femto AP 110 in manager component 210, which can comprise monitor component 214 and distribution component 218. Monitor component 214 has substantially the same or the same functionality as monitor component 124, and distribution component 218 has substantially the same or the same functionality as distribution component 128. Exchange of information, e.g., data or signaling, amongst monitor component 214 and local memory 114 can be effected through at least one of a bus architecture or internal programming interfaces; the bus architecture can include at least one of a system bus, a memory bus, an address bus, or a message bus.

Figure 3:
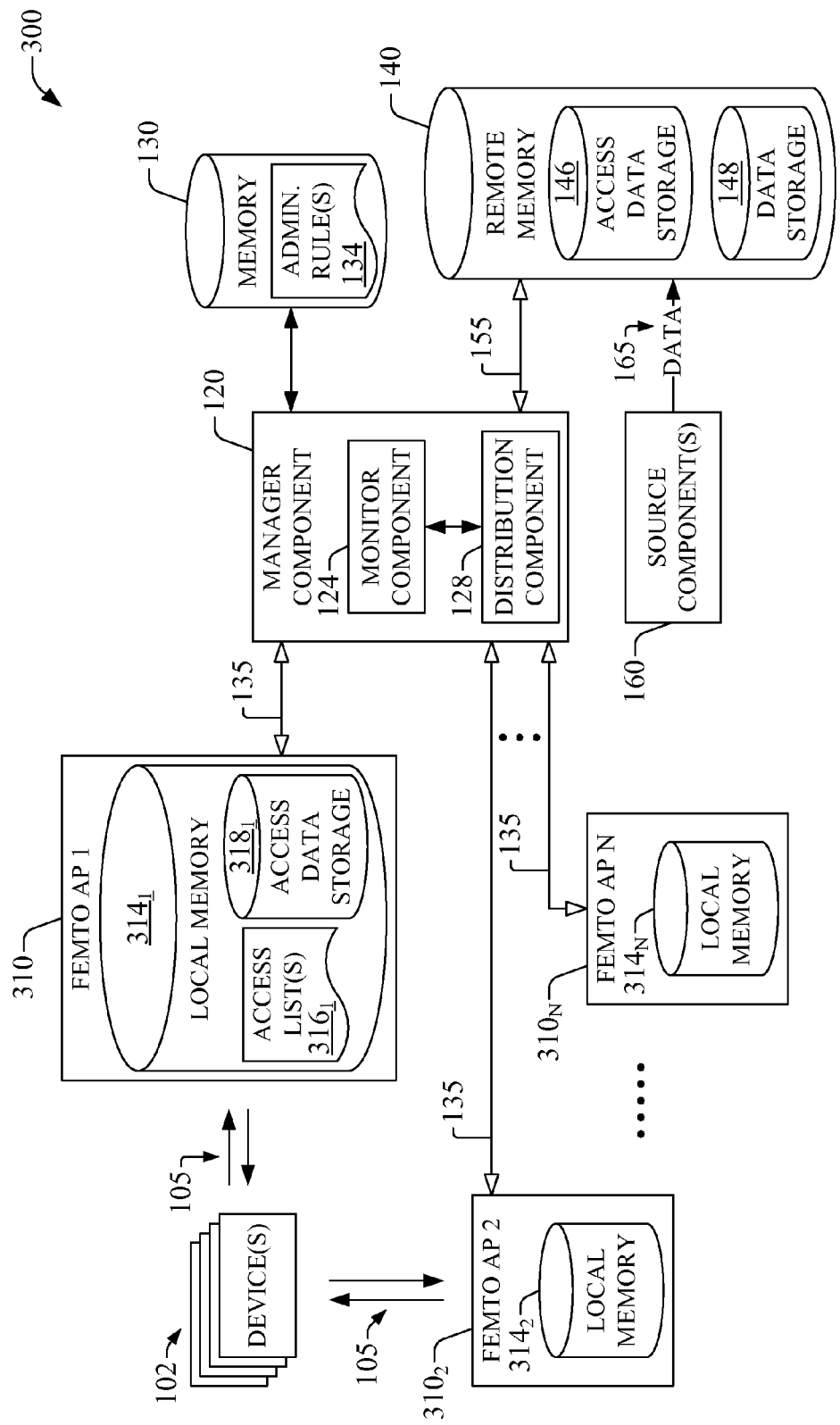
FIG. 3 is a block diagram of another example system that enables control of access and service attributes that regulate access to wireless resources and service in accordance with aspects described herein.

FIG. 3 is a block diagram of an example system 300 that enables control of access and service attributes that regulate access to wireless resources and service in accordance with aspects described herein. Manager component 120 supplies access and service data as described supra to a set of N femto APs $310_1$-$310_N$, with N a natural number greater or equal than unity. Femto APs $310_1$-$310_N$, can provide wireless coverage to a confined area. As indicated supra, the confined area can include a residential dwelling such as a single-family home or an apartment; a business space, e.g., a hotel, an enterprise place of operation, a factory; an entertainment area which can include bars, night-clubs, or the like; a worship area such as a church or mosque; an educational facility, which can include open and semi-open spaces as it may be the case in a college campus; a wellness area, e.g., a health club; a hospital or nursing home; etc. It should be appreciated that the confined area can be mobile, as it is the case when the set of femto APs $310_1$-$310_N$ are deployed through a cruise ship, a cargo ship, or other type of maritime vessels; a train; etc. Each femtocell AP $310_\lambda$, with $\lambda=1, 2 \ldots N$, is functionally connected to manager component 120 through an interface 135 and exchange information, e.g., data and signaling, with manager component 120 in accordance with standardized protocols or proprietary protocols. In one or more embodiments, a plurality of manager components 120 can coordinate access and service thorough subsets of femtocell APs $310_1$-$310_N$.

Manager component 120 enables, at least in part, access control to femtocell AP $110_\lambda$, through configuration, e.g., addition, deletion, modification, or delivery of access and service attributes. As described supra, such configuration can be automatic and based at least in part on administration rule(s) 134 and reference data. In addition, such configuration can be specific to femto AP $310_\lambda$: Manager component 120 provides different access and service attributes to different femtocell APs at different times to selectively enable or disable different services for different devices at different coverage areas at different times and with different priority; all devices in set 102 need not be provided all or substantially all services from all or substantially all femto APs $310_1$-$310_N$ at all or substantially all times. As an example, femtocell APs $310_1$-$310_N$ can be deployed in cruise ship and access and service attributes can be configured differently for different segments of devices linked to passenger class, with different segments provided location-dependent service and level thereof. Devices of first-class passengers can be allowed access and provided service throughout the entire cruise ship (e.g., femto AP $310_1$-$310_N$); devices of business class passengers can be provided wireless connectivity throughout the ship with exception of upper deck(s) and state rooms; and economy class passengers can be provided wireless connectivity restricted to lower decks. As described supra, wireless connectivity of First-class passenger can be more comprehensive than that of business class passengers, which in turn can have higher level of wireless service than that of economy class passengers.

Manager component 120 can monitor operation conditions of the set of femtocell APs $310_1$-$310_N$ and coordinate service provided through one or more femtocell AP in the set. Such coordination can be automatic (e.g., without human intervention) and can include changes to access attribute(s) that identify devices allowed to receive wireless service through a femtocell AP, or service attribute(s) that regulates provision of a specific wireless service. Thus, such changes can implement load balancing or service coordination by controlling the APs that supply the specific service(s) and features thereof.

In an aspect, distribution component 128 selectively configures (e.g., adds, removes, or modifies) access attributes in access control list(s) $316_\lambda$ or service attributes in access data storage $318_\lambda$. Through such selective configuration, e.g., provision of different subscriber station identities to access control list(s) in different femtocell APs, access to wireless service can be coordinated or distributed across multiple femto APs and thus load of radio interface or backhaul link(s) and network can be balanced. Likewise, such selective configuration can allow provision of different services through different femtocell access points, which can enable restriction of access to wireless service to specific locations or coverage areas, or control of provided wireless service.

Figure 4:
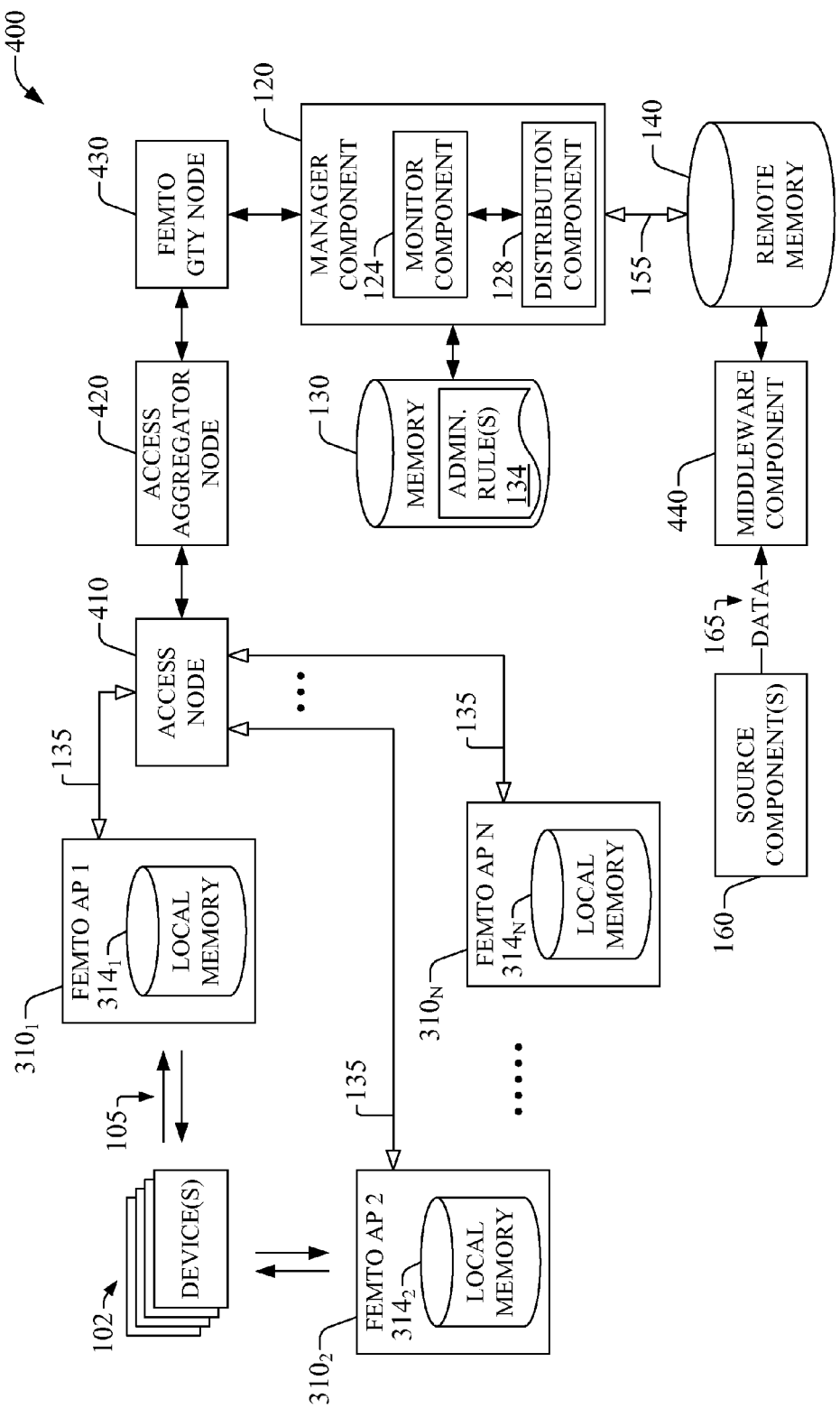
FIG. 4 is a block diagram of yet another example system that enables control of access and service attributes that regulate access to wireless resources and service in accordance with aspects described herein.

FIG. 4 is a block diagram of an example system 400 that enables control of access and service attributes that regulate access to wireless resources and service in accordance with aspects described herein. Manager component 120 and remote memory 140 are centralized in a communication service provider network platform or core network. In an aspect, manager component 120 can be implemented in an Application Server (AS) within an internet protocol (IP) Multimedia Subsystem (IMS) or as part of a Mobile Switching Center (MSC). In addition or in the alternative, manager component 120 can be part of a femto gateway (gty) node 430. Within the service provider network platform, or core network, conventional standardized or proprietary interfaces can be utilized to functionally connect manager component 120 and remote memory 140 to disparate components in core network. In another aspect, remote memory 140 and data therein can be provided through conventional data storage means or mechanisms; for instance, remote memory 140 can be part of at least one of a Home Location Register (HLR) or a Home Subscriber Server (HSS).

In example system 400, exchange of information, e.g., data or signaling, amongst a femtocell AP and centralized manager component 120 can be accomplished through various access network configurations. As illustrated, each femtocell AP $310_\lambda$ can be functionally coupled to an access node 410, which can be embodied in a network interface device, a gateway node, a DLS access multiplexer, or the like. The access node 410 can be functionally coupled to an access aggregator node 420, which can be embodied in a broadband remote access server (B-RAS). Aggregator node 420 is functionally coupled to femtocell gateway node 430 that is operationally connected to manager component 120 and relays data thereto and there from. In addition, source component(s) 160 can convey data 165 to remote memory 140 through a middleware component 440 that enables access to the communication service provider network platform or core network.

Figure 5A:
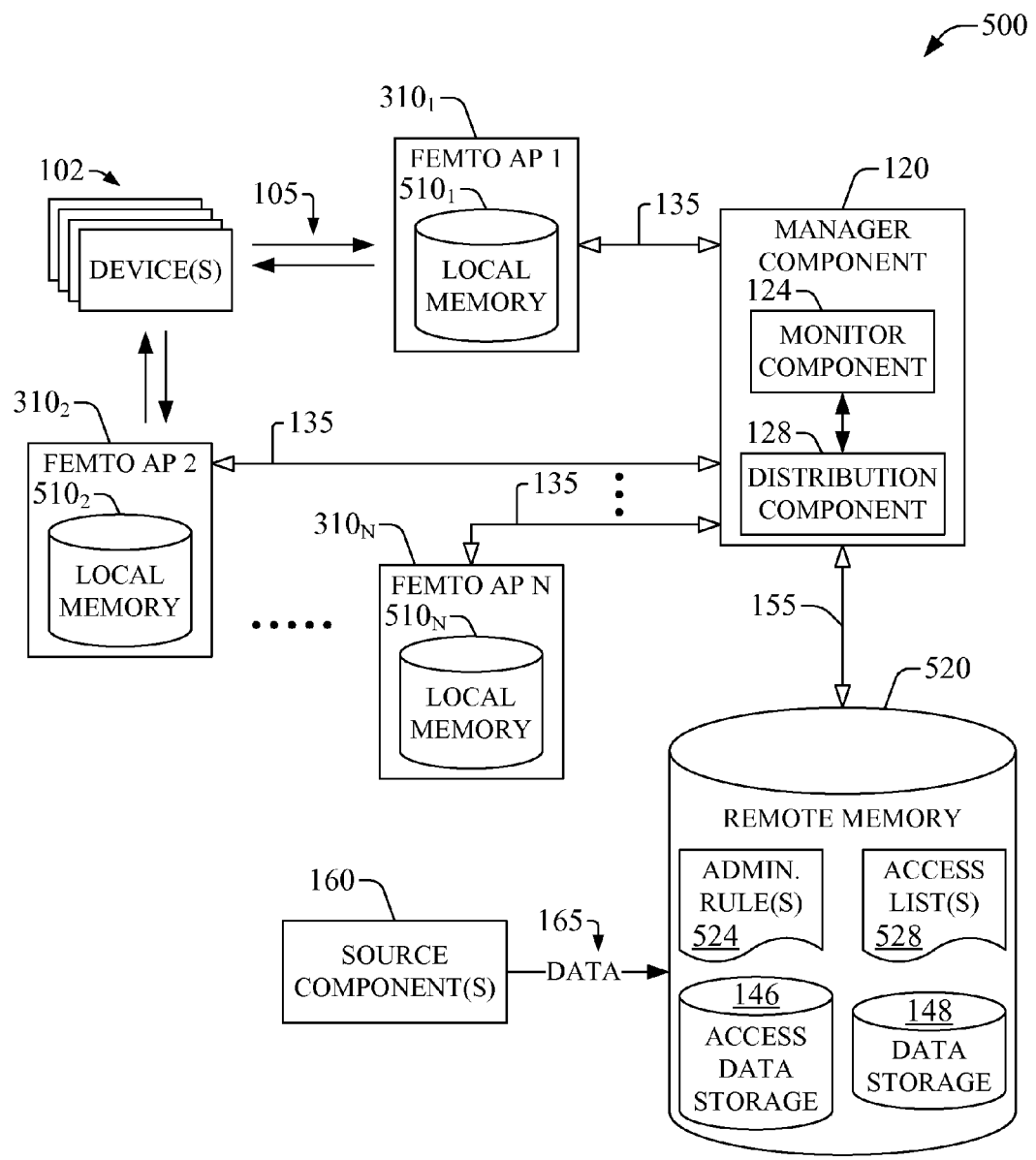
FIGS. 5A-5B display block diagram of example systems that enable control of access and service attributes that regulate access to wireless resources and service in accordance with aspects described herein.
Figure 5B:
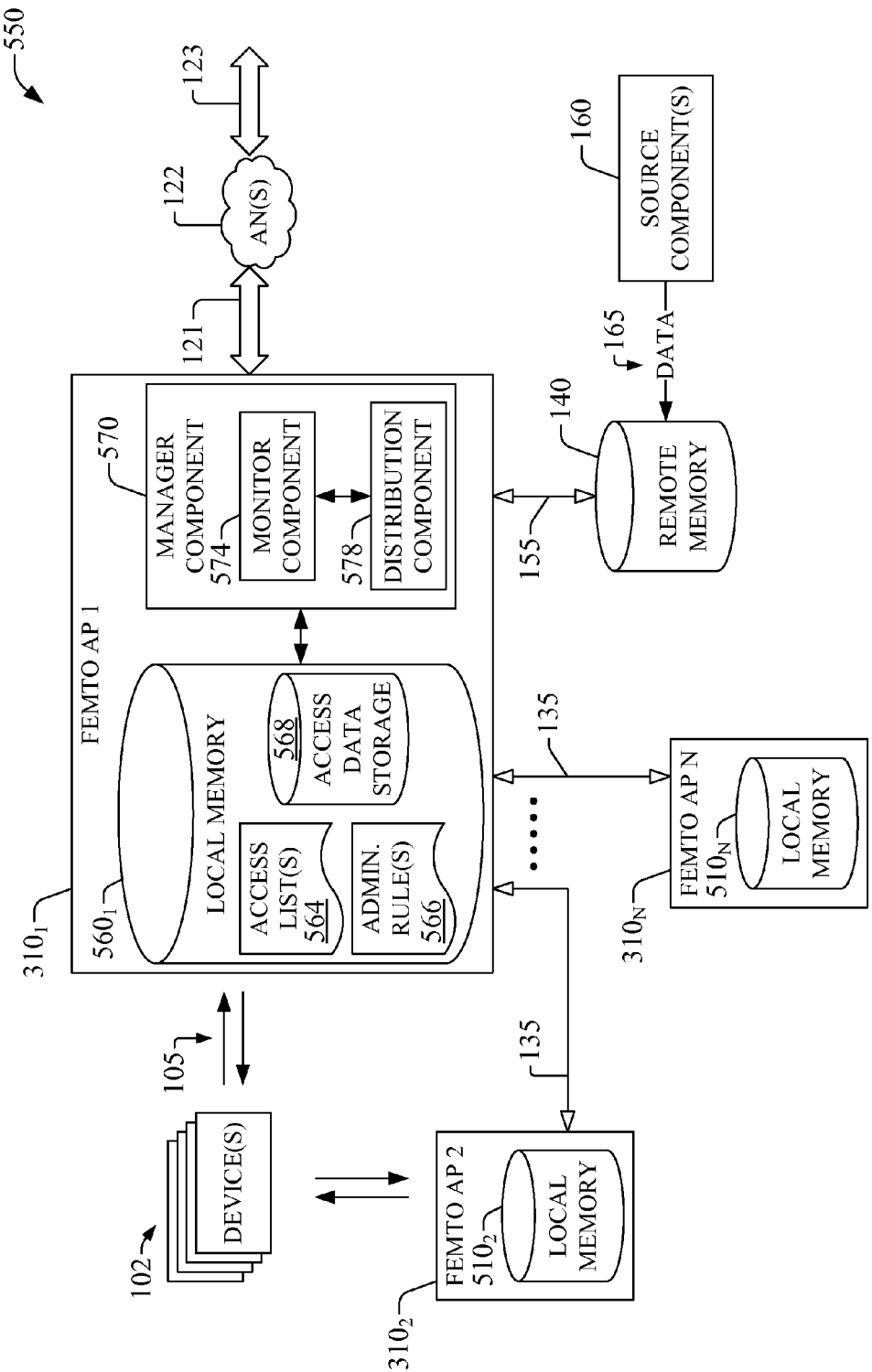

FIGS. 5A-5B display block diagram of example systems that enable control of access and service attributes that regulate access to wireless resources and service in accordance with aspects described herein. In example systems 500 and 550, control of access to wireless resources and telecommunication service can be administered and provided in a centralized manner, which can afford various efficiencies and enable service scenario(s) that can be more effectively controlled than with a distributed approach to access and service attribute management described supra. In particular, service scenario(s) that can benefit from centralized administration of access and service control include scenario(s) with a significant number of prospective users with mobile devices that may request access, e.g., attempt attachment, to one or more femtocell APs, although a the number of devices provided service can be a small subset of the population of prospective users. At least one of such efficiencies can be mitigation of signaling associated with configuration of local access control lists and related service attributes in a large set of femtocell APs; e.g., all femtocell APs in an urban area (e.g., downtown Austin, Tex.).

An example service scenario that can benefit from centralized management is telecommunication in large-scale emergency. In times of large-scale emergency such as natural disaster events (e.g., hurricane strikes a coastal region) that prevent macrocellular telecommunication in affected area, it can be desirable and advantageous to automatically grant authorities (e.g. emergency responders, police, national guard, firemen) access to non-public operational femtocell access points deployed in the affected area and that are closed to general public use during the large-scale emergency while public communication facilities are impaired. As an illustration, such femtocell APs can include those deployed in businesses such as banks or gas stations, which do not normally offer public access; or privately owned home femtocell APs that do not normally provide public access. Configuring access control lists and access data (e.g., service attributes) local to each possibly involved non-public, operational femtocell AP with the identities of all or substantially all mobile devices associated with civil servants in the affected area may not be practical or possible. However, configuration of access and service attributes in centralized data and provision of access to the centralized data administered by manager component 120 can be viable; thus, access can be provided to a significant number of prospective users, even though not simultaneously on a single femtocell AP. In addition, centralized configuration of service attributes can grant authorities priority access to existing public (e.g., open) operational femtocell APs. If regular macrocellular telecommunication capability is restored, centralized control of access to wireless resources and telecommunication service through femtocell APs can cease, and local control of access and services through femtocell APs can resume.

As discussed supra, control of access and service is accomplished via access attributes in an access control list and related service attributes. In centralized administration of access and service control, centralized administration rule(s) 524 and centralized access control list(s) 528 can reside in a single centralized component, e.g., remote memory 520, instead of residing locally within each femtocell AP in a set of femtocell APs, e.g., $310_1$-$310_N$, and respective local memories $510_1$-$510_N$. Accordingly, to control access, attachment signaling (e.g., LAU or RAU in UMTS-based radio technology) received in a femto AP $310_\lambda$, can be relayed to manager component 120, which validate credential(s) of a mobile device that generates the attachment signaling against centralized ACL 528. If the mobile device identity is listed in ACL 528 for femto AP $310_\lambda$, manager component 120 conveys a directive to femto AP $310_\lambda$ to complete attachment procedure. After completion of attachment procedure, femto AP $310_\lambda$ provides telecommunication service in accordance with service attributes in access data storage 146. If the received credential(s) of the mobile device do not match a mobile device identifier in the centralized ACL 528, manager component 120 delivers a directive to femto AP 3101 to reject the attachment signaling (e.g., a directive to convey LAC reject signal in response to LAU attempt). Manager component 120 also can configure access and service attributes for one or more femtocell APs in the set of femto APs $310_1$-$310_N$ in accordance at least in part with at least one of monitored reference data or centralized administration rule(s) 524.

In one or more embodiments, e.g., example system 550, the centralized component that retains ACL(s) and administration rule(s) for manipulation of access attributes and service attributes can be a local memory within a single femtocell AP, such as memory $560_1$ in femto AP $310_1$. In addition, such local memory can be integrated or functionally coupled to a manager component 570 that centrally controls access to wireless resources and telecommunication service through femto APs $310_1$-$310_N$. Centralized manager component 570 can include monitor component 574 and distribution component 578, which operate, respectively, in substantially the same or the same manner as monitor component 124 and distribution component 128. In other embodiments, the centralized component that retains ACL(s) and access data, and can be integrated to a centralized manager component, can be part of a single component in an access network, e.g., access aggregator node 420 or access node 410. In further embodiments, the centralized component can be part of a telecommunication service provider network platform, or core network, or one or more component(s) therein.

Figure 6:
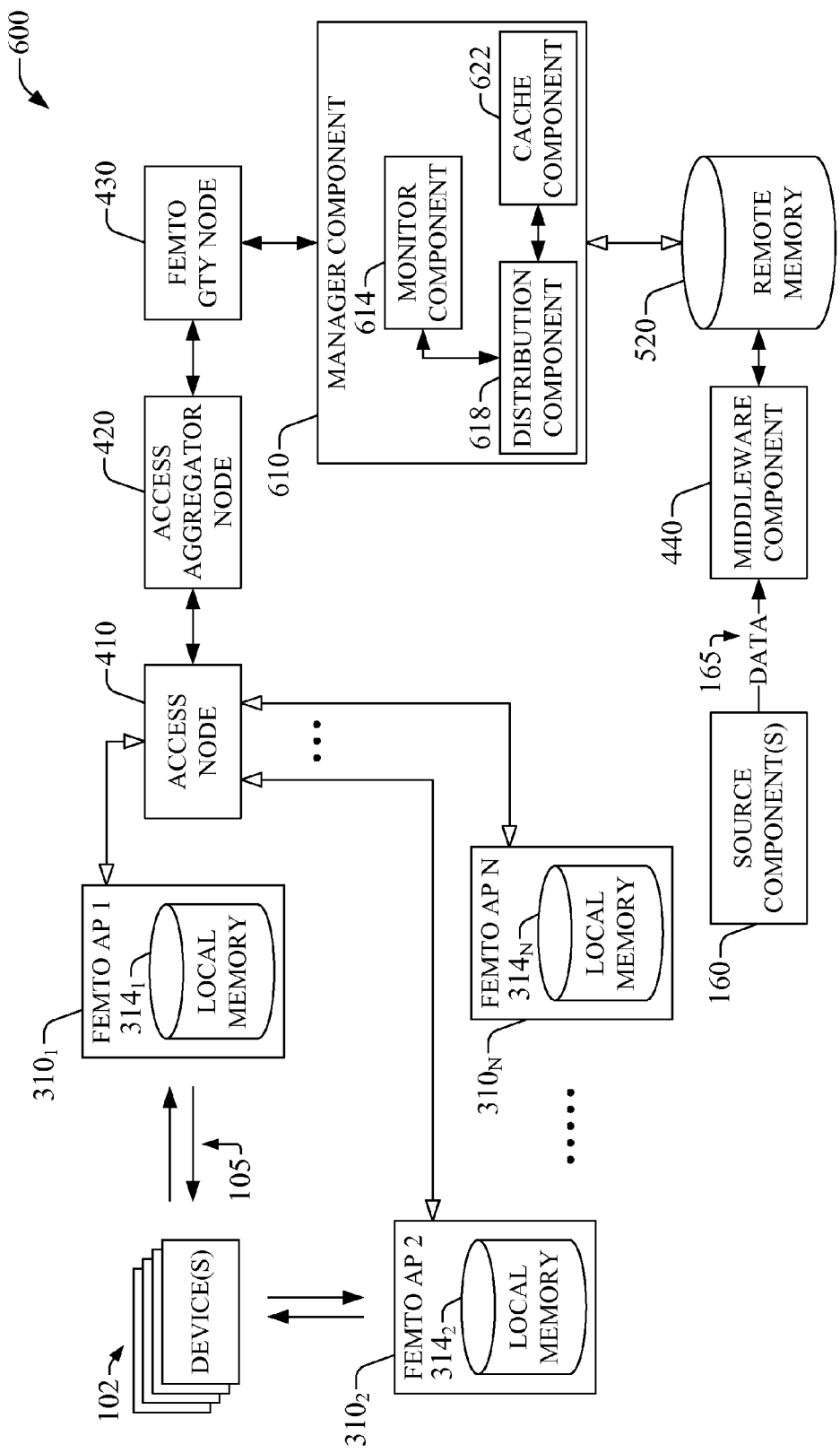
FIG. 6 displays a block diagram of an example system that enables control of access and service attributes that regulate access to wireless resources and service in accordance with aspects described herein.

FIG. 6 displays a block diagram of an example system 600 that enables control of access and service attributes that regulate access to wireless resources and service in accordance with aspects described herein. Optimization or improvement of real-time signaling efficiencies associated with centralized management of control of access and service described supra can be accomplished, at least in part, through centralized administration of access and service data and generation of data cache(s) local to one or more femtocell APs $310_1$-$310_N$. Local data cache(s) can contain a portion of access and service attributes associated with a device in set 102. Such portion of access and service attribute can be that which has a significantly high or highest probability of subsequent reuse, wherein reuse is primarily dictated by access information such as historical attachment signaling to a femtocell AP $310_\lambda$.

In an aspect, if a device attempts to attach, e.g., conveys attachment signaling, to a femtocell AP $310_\lambda$, an ACL that can be retained in local memory $314_\lambda$ is checked to determine if the device has at least one of access rights or configured service attributes; in UMTS-based radio technology, attachment signaling can be location area update (LAU) or routing area update (RAU). In case the identity of the device is not recorded in the ACL that is retained in local memory $314_\lambda$, the femtocell AP $310_\lambda$ checks centralized access control list(s) 524 (not shown in FIG. 6) retained in remote memory 520, wherein the centralized ACL 524 can be larger than the ACL retained in local memory $314_\lambda$. If examination of the centralized ACL 524 reveals a match amongst the identity of the device and a recorded device identifier in centralized ACL 524, femtocell AP $314_\lambda$ downloads at least one of access attribute(s) or service attribute(s) to local memory $314_\lambda$, and the device is granted access to wireless resources and service in accordance with at least one of the downloaded access attribute(s) or service attribute(s). Subsequent attachment attempts conducted by the device can be processed in accordance with the access and service data that is already cached in local memory $314_\lambda$.

Distribution component 618 can manage download of at least one of the access attribute(s) or the service attribute(s). In an aspect, as part of the download, distribution component 618 can receive a request to deliver access and service data associated with an identified device, respond to the request via an ACK (acknowledge) or NACK (negative acknowledge) signal, and deliver access and service data associated with the identified device if the request is acknowledged. In addition or in the alternative to downloading access and service data from remote memory 520, manager component 610 can deliver access and service data to a femtocell AP, or data cache therein, based at least in part on prediction(s) of attachment events at a femtocell AP. To at least that end, cache component 622, which is part of manager component 610, can exploit historical attachment data or access data (e.g., successful attachment) for a set of femtocell APs to generate access or attachment intelligence and predict attachment events at one or more femtocell APs in the set. Access or attachment intelligence related to an access point, either an indoor-based AP (femtocell AP, Wi-Fi AP, etc.) or outdoor-based AP (e.g., macrocellular base station), refers to substantially any or any information that characterizes a mobile device and conditions of attachment, as well as the access point to which attachment is directed or access is intended. Attachment intelligence can comprise, for example, identities for the mobile device and access point; time of attachment or access; data that identifies a subscriber linked to the mobile device and service plan utilized by the subscriber; location information of the access point (e.g., location area code, cell identity); identification of the access point (AP ID; customer premise equipment ID, etc.); or the like. In addition, attachment or access intelligence also can comprise information generated through aggregation or analysis of data included in available attachment intelligence, such as temporal or spatial patterns of attachment or access for a mobile device or segment of mobile device, presence information linked to specific femtocell AP(s), or the like.

In an aspect, cache component 622 can predict attachment events or pattern thereof through inference—e.g., reasoning and generation of conclusion based upon a set of metrics, arguments, or known outcomes in controlled scenarios—produced via artificial intelligence (AI) or machine-learning methods. To produce an inference, cache component 622 can apply machine-learning methods to available access or attachment intelligence, which can be retained in remote memory 520. The artificial intelligence methods or techniques referred to herein typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, cache component 622 can employ one of numerous methodologies for learning from data and then drawing inferences from the models so constructed. As an example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory) and other approaches that perform data fusion or the like, can be exploited.

Figure 7:
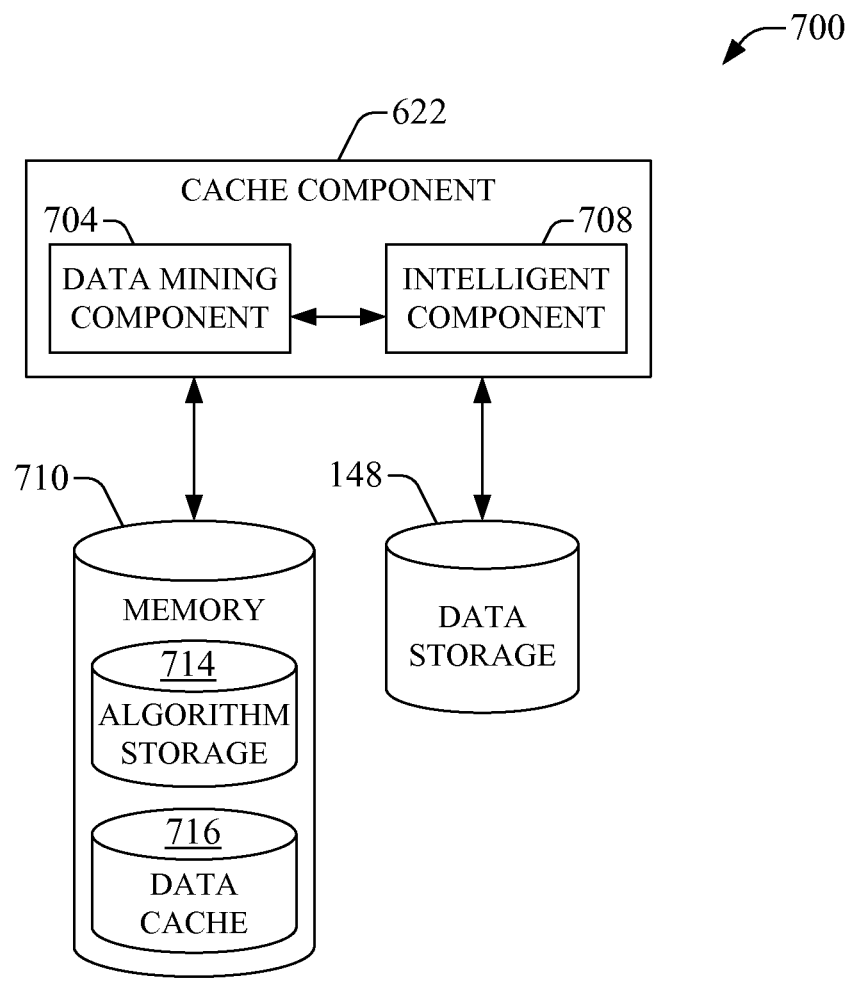
FIG. 7 is a block diagram of an example embodiment of a cache component in accordance with aspects of the subject disclosure.

In an embodiment, e.g., example embodiment 700 illustrated in FIG. 7, cache component 622 can exploit intelligence component 708 to learn from data and then draw inferences and thus predict attachment events. Intelligent component 708 can exploit the foregoing machine-learning methodologies for learning from data, which comprises attachment data and can be retained in data storage 148; the methodologies can be retained in memory element 714 within memory 710. Data storage also can include attachment intelligence, as described supra; in an aspect of embodiment 700, data mining component 704 can generate the attachment intelligence and record it in data storage 148. Data mining component 704 can generate the attachment intelligence through data aggregation, which can include the following. Generation of statistics of attachment including rejection thereof; identification of location of femtocell AP and association thereof with attachment events; extraction of patterns of attachment signaling; classification and segmentation such as compilation of attachment signaling associated with at least one of a specific period, location(s) of attachment, rate of attempts; or the like. One or more methods or algorithms for data aggregation can be retained in algorithm storage 714, and can include at least one of the AI methods indicate supra. In another aspect of embodiment 700, data cache 716 can retain a portion of historical attachment data as a training set for learning and evaluating accuracy of attachment predictions originated from various learning models. Cache component 722 can flush data cache 716 periodically or at predetermined intervals.

Access and service data retained in data cache(s) in local memory $314_\lambda$ can be automatically removed based at least in part on a retention protocol (not shown) retained in local memory $314_\lambda$. The retention protocol includes predetermined parameters (e.g. an inactivity period, priority ranking(s) ...) that dictate retention or removal of data in a data cache. Removal of local data can be effected to enable access to wireless service by a higher priority device. Femtocell $310_\lambda$ or manager component 610 can exploit the retention protocol and remove the local data. In an aspect, manager component 610 can deliver an indication, e.g., message(s), to femtocell $310_\lambda$ to remove data. In another aspect, femtocell $310_\lambda$ can remove local data without intervention from manager component 610; for example, if a data validity timer expires, removal can be effected upon expiration of the data validity timer or after a predetermined latency period subsequent to expiration.

Figure 8:
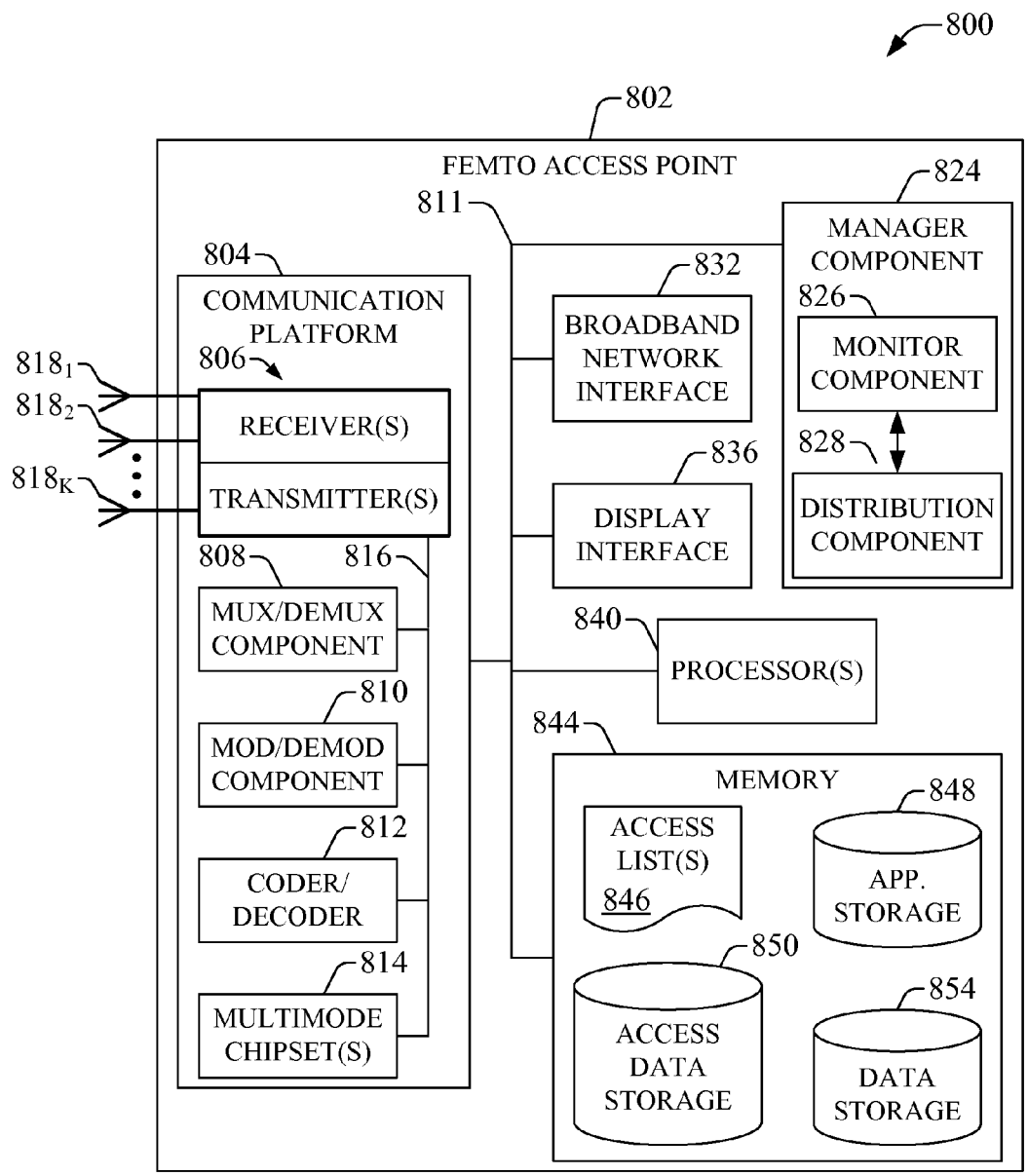
FIG. 8 displays an example embodiment of an indoor-based access point that can operate in accordance with aspects of the subject innovation.

FIG. 8 illustrates an example embodiment 800 of a femtocell AP 802 that can operate in accordance with aspects of the subject disclosure. Femtocell AP 802 can embody one or more of femto AP 110 or $310_1$-$340_N$, or any other indoor-based access point referred to and described herein. To enable wireless service, femto AP 802 includes communication platform 804. Communication platform 804 comprises a set of receiver(s)/transceiver(s) 806. While each transceiver in the set includes an antenna $818_\kappa$, with $\kappa=1, 2, \ldots K$, with K a natural number greater or equal than unity, each antenna $615_\kappa$ can be disabled (logically or physically) if wireless signals are delivered through antennas related to the one or more transmission points. In the subject disclosure, receiver(s)/transceiver(s) 806 transmit and receive signal via broadband network interface 832 and antennas $818_\kappa$.

Communication platform 804 comprises electronic components and associated circuitry that enable processing and manipulation, e.g., coding/decoding, deciphering, modulation/demodulation, of signal(s) received by femto AP 802 and signal(s) to be transmitted by femto AP 802; received or transmitted signal(s) are modulated and coded, or otherwise processed, in accordance with various radio technology protocols (e.g., 3GPP UMTS, 3GPP LTE . . . ). Components, or functional elements, in communication platform 804 exchange information through a bus 816; information includes data, code instructions, signaling, or the like, and the bus 816 can be embodied in at least one of a system bus, and address bus, a data bus, a message bus, or a reference link or interface. The electronic components and circuitry can include the set of K receiver(s)/transmitter(s) 806 and component(s) therein, a multiplexer/demultiplexer (mux/demux) component 808, a modulator/demodulator component 810, a coder/decoder 812, and a set of one or more chipsets, e.g., multi-mode chipset(s) 814. Receiver(s)/transmitter(s) 806 can convert signal from analog to digital and vice versa. In addition, receiver(s)/transmitter(s) 806 can divide a single data stream into multiple parallel data streams, or perform the reciprocal operation; such operations typically conducted in various multiplexing schemes. Functionally coupled to receiver(s)/transmitter(s) 806 is a multiplexer/demultiplexer (mux/demux) component 808 that enables processing or manipulation of signal(s) in time and frequency space or domain. Electronic mux/demux component 808 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 808 can scramble and spread information (e.g., codes) according to substantially any code; e.g., Hadamard-Walsh codes, Baker codes, Kasami codes, polyphase codes, and so on. A modulator/demodulator (mod/demod) component 810 also is a part of communication platform 804, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 800, mod/demod component 810 is functionally coupled to mux/demux component 808 via bus 816. In addition, processor(s) 840 enables, at least in part, femto AP 802 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 804 also includes a coder/decoder 812 that operates on data in accordance with one or more coding/decoding schemes suitable for communication, at least in part, through one or more receivers(s)/transmitter(s) 806. When telecommunication through one or more transmission point(s) (not shown) associated with femto AP exploits multiple-input multiple-output (MIMO), multiple-input single-output (MISO), or single-input multiple-output (SIMO) operation, coder/decoder 812 can implement at least one of space-time block coding (STBC) and associated decoding; or space-frequency block (SFBC) coding and associated decoding. Coder/decoder 812 also can extract information from data streams coded in accordance with spatial multiplexing scheme. To decode received information, e.g., data or control, coder/decoder 812 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 812 can employ, at least in part, mux/demux component 808 and mod/demod component 810.

In addition, communication platform 804 can process signal(s) originated in a wireless environment within a set of one or more EM radiation frequency bands, also referred to herein as frequency bands. The set can comprise radio frequency (RF) portion(s) and microwave portion(s) of the EM spectrum, although other spectral regions such as infrared (IR) also can be included. In an aspect, the set of one or more EM radiation frequency bands can include at least one of (i) all or substantially all licensed EM frequency bands, or (ii) all or substantially all unlicensed frequency bands currently available for telecommunication. It is noted that the set is reconfigurable and can be upgraded to incorporate frequency bands, or frequency carriers therein, as such bands or carriers become available for telecommunication, e.g., auctioned for utilization or authorized for free-of-charge utilization. In addition, communication platform 804 can operate in accordance with a configurable set of radio technologies, or communication protocols thereof. As new radio technologies become standardized, or available, a network operator that provides telecommunication service can introduce such technologies in the set of radio technologies that can be utilized for telecommunication through a femto AP 802 deployed in a confined restricted area.

In embodiment 800, multimode chipset(s) 814 can enable femto 802 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. The various radio network technologies being part of the set of radio technologies indicated supra. In an aspect, multimode chipset(s) 814 can enable, at least in part, communication platform 804 to operate in accordance with standard protocols specific to a telecommunication mode of operation, e.g., LTE-based communication. In another aspect, multimode chipset(s) 814 can be scheduled to operate concurrently in various modes or within a multitask paradigm in which the multimode chipset(s) 814 operates in a dedicated mode for a specific time interval.

In addition, scanner component 820 can gather data on DL signal strength and quality associated with identified cell or sectors and related networks. To at least that end, scanner component 820 can collect DL reference signal(s) 862 and analyze such signal(s) to determine DL channel quality or strength. In an aspect, signal strength can be determined through received signal strength indicators (RSSIs) or received signal code power (RSCP), while quality can be assessed through metrics such as signal-to-noise ratio (SNR), signal-to-noise-and-interference ratio (SNIR), or energy per chip over total received power ($E_c/N_0$). Moreover, scanner component 820 also can gather uplink (UL) data originated at a mobile device, e.g., 104. In an aspect, scanner component 818 can decode collected UL data to extract a unique identifier of the mobile device. Data collected by scanner component 820 can be retained in data storage 854.

Decoding performed by scanner component 820 can be based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. To determine code sequences and thus one or more of the foregoing identities or identifiers, scanner component 820 can compute cross-correlation of decoded signal(s) and a set of code sequence hypotheses for the various radio technologies included in the set of technologies surveyed by scanner component(s) 812. Code sequences can include at least one of a scrambling code, a pseudonoise (PN) sequence, a chirp-like sequence, and so forth. Code sequence hypotheses can be retained in memory element 854.

In embodiment 800, femto AP 802 includes access manager component 828 that validates credential(s) (e.g., IMSI) of a mobile device that attempts attachment with transmission point(s) (not shown) linked to femto AP 802. In an aspect, scanner component 820 can extract such credential(s) through decoding of UL attachment signaling and supply them to access manager component 828, which checks the credential(s) against access control list(s) (ACL(s)) 846. If received credential(s) of the mobile device are matched with an identified mobile number in ACL(s) 846, attachment procedure (e.g., LAU) is completed and the mobile device is allowed to camp in femto AP 802 and establish emergency and non-emergency calls sessions. Conversely, if the received credential(s) do not match a configured mobile number in ACL(s) 846, access manager component 824 rejects the attachment signaling, e.g., delivers a LAC reject signal in response to LAU attempt, and the mobile device is allowed to make emergency calls only.

Figure 9:
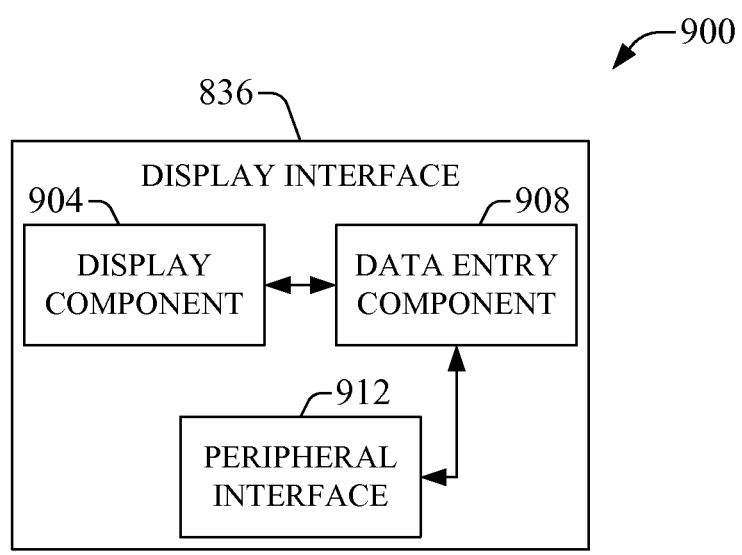
FIG. 9 presents an example embodiment of a display interface within an indoor-based access point in accordance with aspects described herein.

In embodiment 800, femto AP 802 also includes display interface 836, which can render various indicia associated with functions that control operation of femto AP 802 or reveal operation conditions thereof, e.g., available connectivity to backhaul broadband network. In addition, display interface 836 can convey information to an end user, such as number of currently served mobile devices. Information can be conveyed via visual or aural indicia, which can also be employed in connection with messages that convey operational instructions to an end user from a network component such as an interactive voice response (IVR) server or a customer representative terminal. In an example embodiment of display interface 836, see FIG. 9, display component 904 can render prompt(s) or other content(s) associated with leasing a mobile device; to at least such end, display component 904 can convey visual or aural indicia. Various schemes can be employed to render the prompts or other content(s) such as, but no limited to, windows-based schemes, e.g., iconic representation, pop-up representation; or text-based representation, with scroll-down or scroll-sideways delivery, or static rendering. In addition, the prompts or other content(s) can be organized in various configurations within a rendering area (e.g., display screen) that can be a part of display component 904. In an aspect, display component 904 can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like. Display component 836 also can enable communication of aural indicia; for example, via speaker(s).

Display interface 836 also allows entry of data that can enable femto AP 802 to receive external commands (e.g., restart operation) or configuration information (e.g., edit ACL(s) within femto AP 802 or in administration component 120). Display interface 836 can process (e.g., decode/code), at least in part, received input and convey it as signaling to one or more functional elements (component(s), platform(s), etc.) or memory 844 within femto AP 802. To mitigate fraudulent transaction(s), entry of data can be secured through various credential-based mechanisms, such as password protection, biometric protection, or the like, and associated secured transport protocol(s) that can include data encryption. In an aspect, code instructions that can be executed to implement such mechanisms can be retained within application (app.) storage 848. In one or more embodiments, e.g., 900, display interface 836 includes data entry component 408 that enables input of information.

Various functional elements and associated circuitry that can embody, at least in part, data entry component 908 enable data input through one or more gestures (e.g., touch, speech, motion), one or more communication protocols. Such functional elements can include a keypad, a touch screen, a microphone, a camera(s); a bar code reader, radio frequency ID (RFID) reader, infrared (IR) wireless-based reader; or the like. In addition, data entry component 908 also can be functionally coupled to peripheral interface 912 that enables connection to a peripheral device and communication therewith. As an example, peripheral interface 912 can allow connection of an external antenna to receive global navigation data, e.g., global positioning system (GPS) data; the antenna can reside in an outer location of a confined restricted area in which example femto AP 802 is deployed, so the antenna is exposed to open sky. As another example, peripheral interface 912 can enable connection to disparate femto AP(s). In an aspect, peripheral interface 912 can include a set of ports, which comprises at least one of parallel ports, serial ports, Ethernet ports, V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

Femto AP 802 includes processor(s) 840 which can be configured to provide or that can provide, at least in part, functionality to substantially any or any component(s), platform(s), interface(s), node(s), and so forth, within femto AP 802 in accordance with one or more aspects of the described operation of femto AP 802. Processor(s) 840 is functionally coupled to each functional element within femto AP 802 and to memory 844 through bus 811, which can be embodied in at least one of a memory bus, a system bus, an address bus, a message bus, or one or more reference link(s) or interface(s). In embodiment 800, processor(s) 840 is illustrated as external to the various functional elements (e.g., component(s), interface(s), platform(s), node(s)) of femto AP 802; however, in additional or alternative embodiment(s), processor(s) 840 can be distributed amongst a plurality of such functional elements. In some embodiment(s), one or more functional elements that comprise femto AP 802 can reside within memory 840 as one or more sets of code instructions that, when executed by processor(s) 840, implement the various functional elements and described functionality thereof.

Processor(s) 840 also can supply information to and retrieve information from memory 844. Such information can enable, at least in part, operation of and/or can provide, at least in part, functionality to communication platform 804, and at least a portion of functional elements therein; manager component 824 and component(s) therein; display interface and functional element(s) therein; as well as other operational components (not shown) of femto AP 802. The information can include at least one of code instructions, code structure(s), data structures, or the like.

Processor(s) 840 can execute code instructions stored in memory 844, for example within app. storage 848, or other memory(ies) functionally coupled to femto AP 802, to provide, at least in part, the described functionality of femto AP 802. Such code instructions can include program modules or software or firmware applications that implement various methods described in the subject specification and associated, at least in part, with functionality or operation of femto AP 802.

Memory 844 also can retain, at least in part in application storage 848, at least one of data structures (e.g., objects, classes, metadata); code structure(s) (e.g., modules, procedures) or instructions; or substantially any type of software or firmware application(s) that processor(s) 840 can execute to provide, at least in part, functionality associated with substantially any or any component(s), platform(s), interface(s), or functional element(s) within femto AP 802 in accordance with aspects described herein. In addition, memory 844 can store network or device information, e.g., within data storage 848 or credential storage 850, such as encoded pilot signal(s) (e.g., LAC 852); one or more communication protocol(s) or technical specification(s); code sequences for scrambling or spreading; blind decoding hypotheses; semi-persistent scheduling parameters; frequency offsets, macrocell and femtocell identifiers (IDs); address book(s); or the like. Moreover, memory 844 can retain content(s) such as multimedia files or subscriber-generated data. Furthermore, memory 844 can retain, e.g., within access data storage 850, security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary international mobile subscriber identity (TIMSI), packet TIMSI (P-TIMSI), an IMEI, an MDN, a MIN, a TIA ESN, or a multi-bit identification number such as MEID. It is noted that memory 844 can include affixed or removable elements such as a subscriber identification module (SIM) card storage, a universal integrated circuit card (UICC) storage, or a removable user identity module (RUIM). In one or more embodiments, at least a portion of memory 844 and content thereof can be external to femto AP 802 and linked thereto via a peripheral interface (e.g., 912).

In view of the example systems described above, example methods that can be implemented in accordance with the disclosed subject matter can be better appreciated with reference to FIGS. 10-19. For purposes of simplicity of explanation, methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more methods disclosed herein could alternatively be represented as a series of interrelated states or events, such as in a state diagram. Moreover, interaction diagram(s) or call flow(s) may represent one or more methods described herein in accordance with the disclosed subject matter when disparate entities enact disparate portions of the one or more methods. Furthermore, not all illustrated acts may be required to implement a described method in accordance with the subject specification. Further yet, two or more of the disclosed methods can be implemented in combination, to accomplish one or more features or advantages described herein.

Methods disclosed throughout the subject specification and annexed drawings are capable of being stored on an article of manufacture to facilitate transporting and transferring such methods to computers for execution, and thus implementation, by a processor or for storage in a memory. In an aspect, one or more processors, such as processor(s) that enact the method(s) described herein, can be employed to execute code instructions retained in a memory, or any computer- or machine-readable medium, to implement method(s) described herein; the code instructions provide a computer- or machine-executable framework to enact the method(s) described herein.

Figure 10:
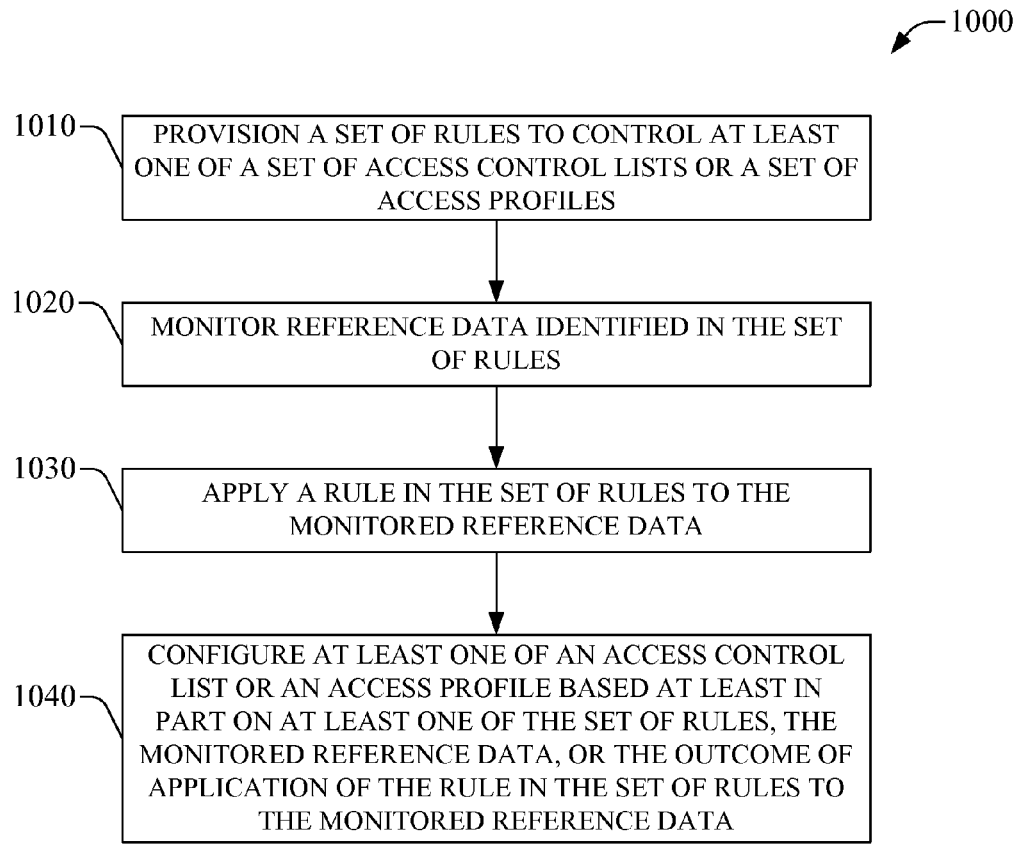
FIG. 10 is a flowchart of an example method for controlling access rights to wireless resources and telecommunication services according to aspects of the subject innovation.

FIG. 10 is a flowchart of an example method 1000 for controlling access rights to wireless resources and telecommunication services according to aspects of the subject disclosure. In an aspect, a management component (e.g., manager component 120) or one or more component(s) therein can implement, at least in part, the subject example method. In another aspect, one or more processors configured to provide or that provide at least part of the functionality to the management component (e.g., manager component 120) also can enact, at least in part, the subject example method. In a further aspect, one or more processors that execute the management component (management component 120) or a set of code instructions that implement the management component and its functionality also can enact the subject example method. At act 1010, a set of rules to control at least one of a set of access control lists or a set of access profiles is provisioned. Provisioning can include receiving the set of rules and retaining such set in a memory accessible by component(s) or processor(s) that enact the subject example method. In addition or in the alternative, provisioning can include generating the set of rules and retaining it in memory. At act 1020, reference data identified in the set of rules is monitored. As described supra, reference data is data that directly or indirectly affect wireless service provided by one or more femtocell APs in the coverage area(s) associated with the one or more femtocell APs (see, e.g., FIG. 1 and associated description). At act 1030, a rule in the set of rules is applied to the monitored reference data. At act 1040, at least one of an ACL or an access profile are configured based at least in part on at least one of the set of rules, the monitored reference data, or the outcome of application of the rule in the set of rules to the monitored reference data.

Figure 11:
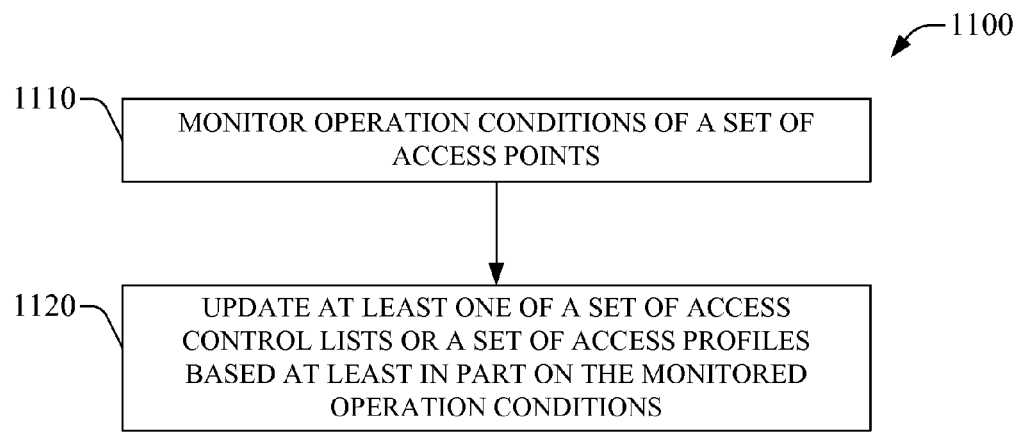
FIG. 11 is a flowchart of an example method for adjusting an ACL in accordance with aspects described herein.

FIG. 11 is a flowchart of an example method 1100 for adjusting an ACL in accordance with aspects described herein. In an aspect, a management component (e.g., manager component 120) or one or more component(s) therein can implement, at least in part, the subject example method. In the alternative or in addition, one or more processors configured to provide or that provide at least part of the functionality to the management component, or component(s) therein, also can enact, at least in part, the subject example method 1100. In another aspect, one or more processors that execute the management component (e.g., management component 120) or a set of code instructions that implement the management component and its functionality also can enact the subject example methods. At act 1110, operation conditions of a set of access points are monitored. The set of APs can be networked, for example, via the management component (see, e.g., FIG. 3) or various groups of APs within the set can be networked through respective management components, with the groups not operating in a networked manner. The operation conditions can include load conditions (e.g., level of traffic congestion) of one or more APs or regions served thereby, or the like. At act 1120, at least one of a set of access control lists or a set of access profiles are updated based at least in part on the monitored operation conditions. Such update can be automatic (e.g., without human intervention) and can include changes to (1) access attribute(s), in one or more ACLs, that identify devices allowed to receive wireless service through a femtocell AP, or (2) service attribute(s), in an access profile, that regulates provision of a specific wireless service. Thus, such update can implement load balancing or service coordination by controlling the APs that supply the specific service(s) and features thereof.

Figure 12:
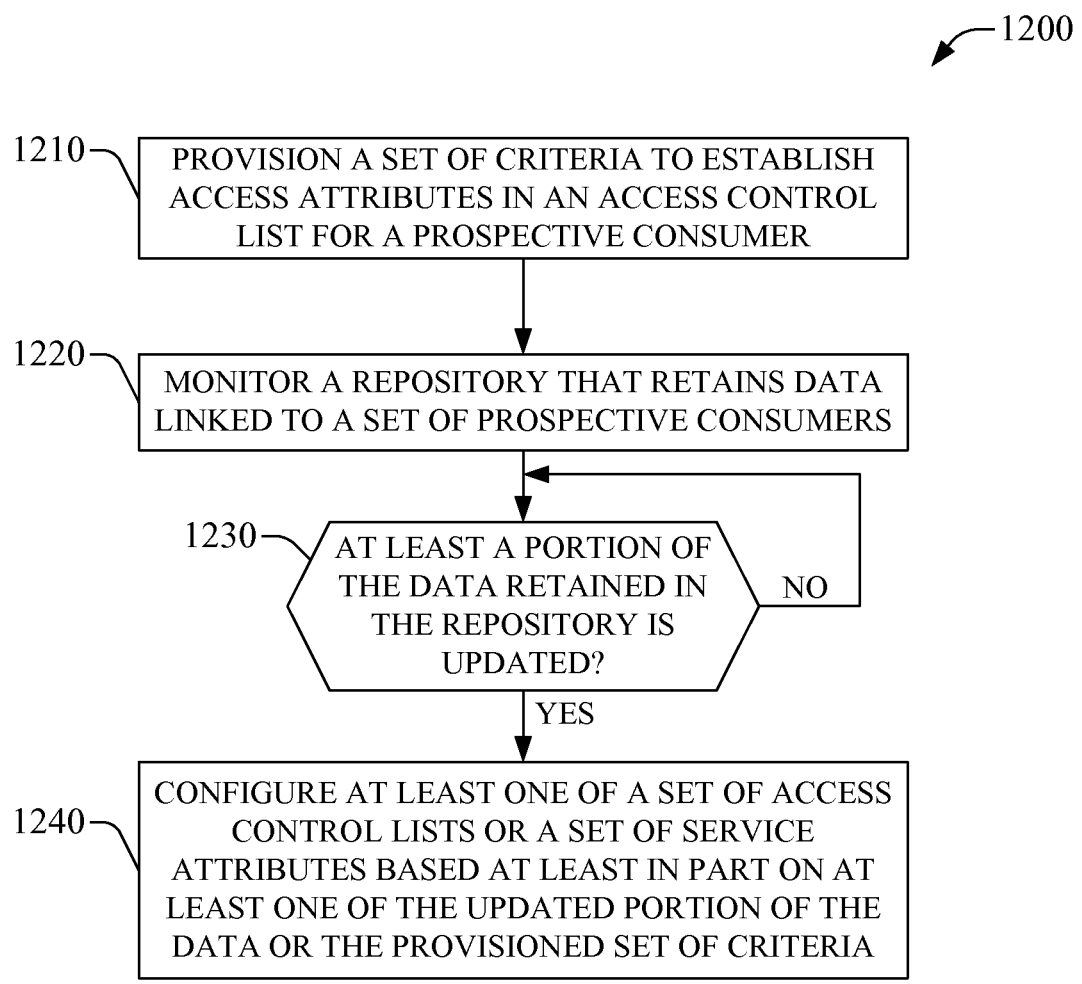
FIG. 12 displays a flowchart of an example method for controlling access rights to wireless resources and telecommunication services according to aspects of the subject innovation.

FIG. 12 displays a flowchart of an example method 1200 for controlling access rights to wireless resources and telecommunication services according to aspects of the subject disclosure. The subject example method is an illustration of at least a portion of example method 1000 in particular scenario(s). One or more acts of example method 1200 can be part of one or more acts in example method 1000. In an aspect, a management component (e.g., manager component 120) can implement, at least in part, the subject example method. In another aspect, one or more processors configured to provide or that provide at least part of the functionality to the management component (e.g., manager component 120) also can enact, at least in part, the subject example method. In a further aspect, one or more processors that execute the management component (management component 120) or a set of code instructions that implement the management component and its functionality also can enact the subject example method. At act 1210, a set of criteria to establish access attributes in an access control list for a prospective consumer is provisioned. Provisioning the set of criteria can include generating the set of criteria and committing the set to a memory accessible by component(s) or processor(s) that enact the subject example method. Alternatively or additionally, provisioning the set of criteria can include receiving at least part of the set rather than generating a complete set of criteria. The subject act can be part of act 1010, wherein the set of criteria is at least a portion of the set of rules.

At act 1220, a repository that retains data linked to a set of prospective consumers can be monitored. As described supra, monitoring can include at least one of polling the repository periodically with polling rate γ or at scheduled instances, or subscribing to an update service to receive indication(s), e.g., an update message, that changes to the repository have been committed. In an aspect, a database manager that administers contents in the repository can provide such service and supply related update messages. In an example scenario, the repository can be a database of guest in a hotel, travelers in cruise, customer in a business space, or the like. The subject act can be part of act 1020, with at least a portion of the reference data embodied in the data linked to prospective consumers.

At act 1230, it is determined if at least a portion of the data retained in the repository is updated. The determination can be based at least in part on the mechanism employed to monitor the repository: For instance, if an update message is received by the component that implements the monitoring, an updated has occurred. Alternatively, if the monitoring mechanism is based on polling the repository, changes in the repository can be identified, for example, through changes in a checksum variable. If the outcome of act 1230 is negative, flow is redirected to act 1230. Conversely, if the outcome conveys an update, flow is directed to act 1240, in which at least one of a set of access control lists or a set of service attributes are configured based at least in part on at least one of the updated portion of the data or the provisioned criteria. In an aspect, act 1240 can be part of configuration act 1040.

Figure 13:
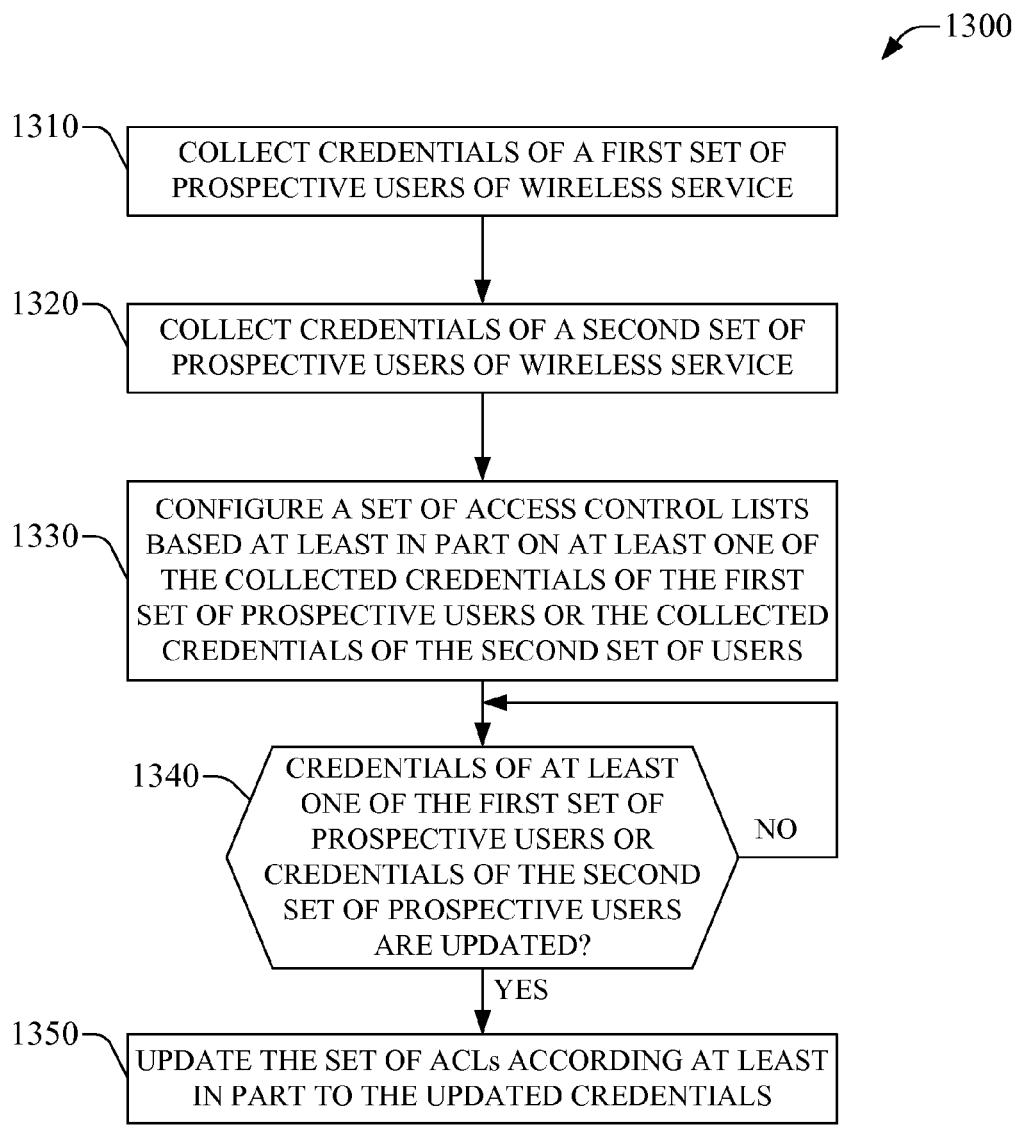
FIG. 13 is a flowchart of an example method for controlling access rights to wireless resources and telecommunication services for disparate prospective users according to aspects described herein.

FIG. 13 is a flowchart of an example method 1300 for controlling access rights to wireless resources and telecommunication services for disparate prospective users according to aspects described herein. The subject example method is illustration of at least a portion of example method 1000 in particular scenario(s). The subject example method can be effected by the same component(s) or functional elements, e.g., processors, that implement example method 1000. One or more acts of the subject example method 1300 can be part of one or more acts in example method 1000. At act 1310, credentials of a first set of prospective users of wireless service are collected. In an illustrative scenario, the first set of prospective users can be one or more employees of an organization that can consume telecommunication service(s) within the premises of the organization. At act 1320, credentials for a second set of prospective users of wireless service are collected. In the illustrative scenario supra, the second set of prospective users can be a group of one or more guests of the organization, the guest(s) can be supplied with wireless service during visit to the organization premises. In an aspect, acts 1310 and 1320 can be part of act 1020, with the credentials of the first and second set of prospective users being part of the reference data. At act 1330, a set of ACLs is configured based at least in part on at least one of the collected credentials of the first set of prospective users or the collected credentials of the second set of prospective users. At act 1340, it is determined if credentials of at least one of the first set of prospective users or credentials of the second set of prospective users are updated. A negative outcome leads to further probing for updates to the credentials, whereas a positive outcome leads to act 1350, at which the set of ACLs is updated according at least in part to the updated credentials. In the example scenario referred to supra, credential(s) of a guest of the organization can expire if an allowed visit period lapses, which can results in removal of identifier(s) of mobile device(s) of the guest from one or more ACLs linked to access points that provide wireless coverage to area(s) that the guest has visited. In an aspect, acts 1330 and 1350 can be part of configuration act 1040.

Figure 14:
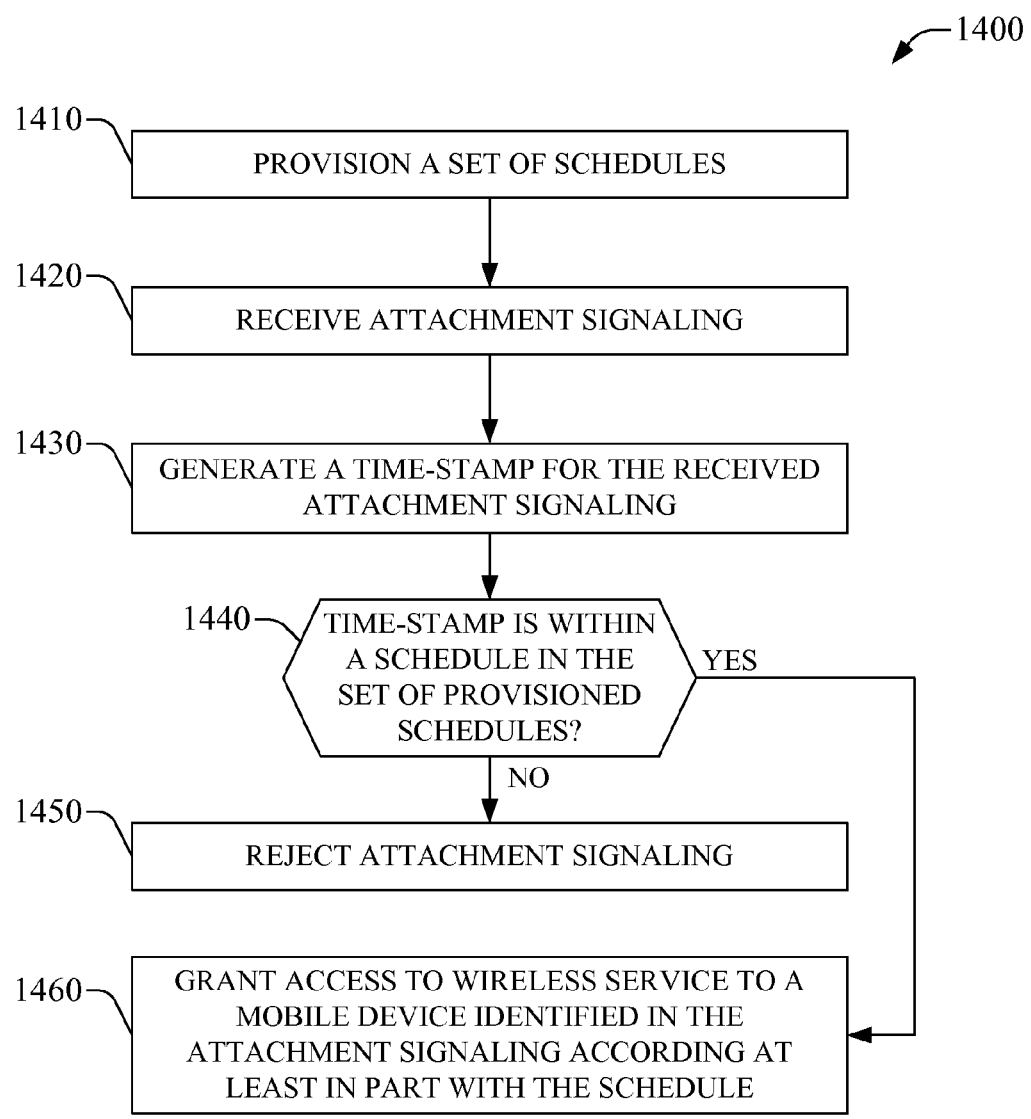
FIG. 14 is a flowchart of an example method for providing access to wireless service through an access point according to aspects described herein.

FIG. 14 is a flowchart of an example method 1400 for providing access to wireless service through an access point according to aspects described herein. The access point can be an indoor-based AP (e.g., a femtocell, a Wi-Fi AP, a picocell base station . . . ) or an outdoor-based base station, such as a macrocellular Node B. The subject example method is an illustration of at least a portion of example method 1000 in particular scenario(s). One or more acts of example method 1400 can be part of one or more acts in example method 1000. The subject example method can be implemented by a management component or component(s) therein that can reside within the access point or be external thereto. Alternatively or additionally, one or more processors can enact the subject example method 1400; the one or more processors can be configured to provide or can provide, at least in part, functionality to the management component or one or components therein. Further, one or more processors that execute the management component (manager component 120) or component(s) therein, or a set of code instructions that implement the management component or component(s) therein and their functionality also can enact the subject example method. At act 1410, a set of schedules is provisioned. Provisioning of a schedule in the set can include generating the schedule through an access interface (e.g., a user interface) that can be remote, either mobile or non-mobile, to the management component or the access point, or can be part of the management component or access point. In addition, provisioning of such schedule can include retaining the schedule in a memory that can be accessed by the component(s) or processor(s) that implement the subject example method. The subject act can be part of act 1010, wherein the set of rules includes the set of schedules. At act 1420, attachment signaling is received. The signaling is specific to the radio technology utilized by the access point; e.g., in UMTS-based technology, attachment signaling can include LAU or RAU. The subject act can be part of act 1020.

At act 1430, a time stamp is generated for the received attachment signaling. The time stamp can be generated at least in part through a clock source in the access point and functionality thereof that enables extraction of a current time (e.g., a processor in the access point executes a system call that generates a current time). The subject act can be part of act 1030, wherein the rule that is applied can include generating a time stamp for received attachment signaling. At act 1440, it is established if the time-stamp is within a schedule in the set of provisioned schedules. In the negative case, attachment signaling is rejected at act 1450. Conversely, in the positive case, access to wireless service is granted to a mobile device identified in the attachment signaling, the access is granted according at least in part to the schedule. In an aspect granting access includes updating an access control list to include identity (ID) of the mobile device as conveyed in the attachment signaling; for example, in UMTS-based technology, the ID can include IMSI, temporary mobile subscriber identity (TMSI), packet TMSI (P-TMSI), or the like.

Figure 15:
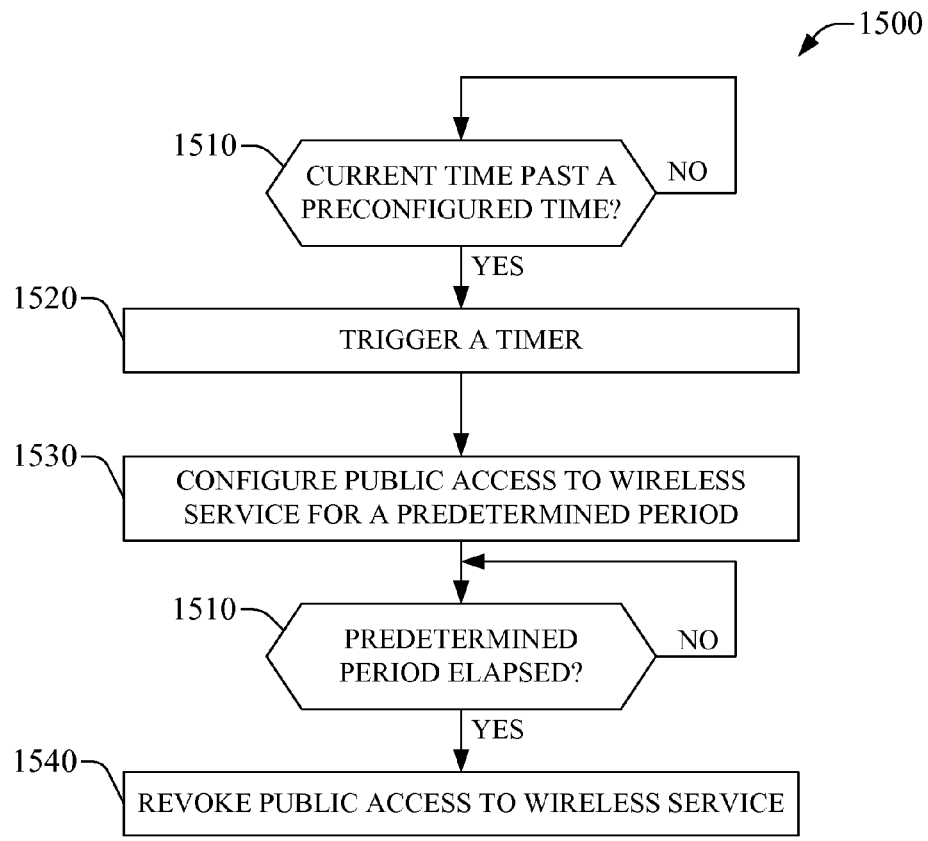
FIG. 15 is a flowchart of an example method for providing public access to wireless service through an access point according to aspects described herein.

FIG. 15 is a flowchart of an example method 1500 for providing public access to wireless service through an access point according to aspects described herein. The access point can be an indoor-based AP (e.g., a femtocell, a Wi-Fi AP, a picocell base station . . . ) or an outdoor-based base station, such as a macrocellular Node B. The subject example method is an illustration of at least a portion of example method 1000 in particular scenario(s). One or more acts of example method 1500 can be part of one or more acts in example method 1000. The subject example method can be implemented by a management component or component(s) therein that can reside within the access point or be external thereto. Alternatively or additionally, one or more processors can enact the subject example method 1500; the one or more processors can be configured to provide or can provide, at least in part, functionality to the management component or one or components therein. Further, one or more processors that execute the management component (manager component 120) or component(s) therein, or a set of code instructions that implement the management component or component(s) therein and their functionality also can enact the subject example method. At act 1510, it is determined if a current time is past a preconfigured time. In an aspect, owner or lessee of the access point establishes the preconfigured time. In another aspect, the access point or the management component can autonomously establish the preconfigured time. In case outcome to act 1510 is negative, the subject act is re-enacted. Conversely, in case outcome is positive, a timer is triggered at act 1520.

At act 1530, public access to wireless service is configured for a predetermined period. In an aspect, public access can be configured through an access attribute that overrides access control through validation of identity of a mobile device that attempts attachment to the access point. For instance, an ALC that regulates access to the access point can include a "Public" logic flag that, if set to "true" and when attachment signaling is received, allows the AP to proceed with attachment procedure(s) without mobile ID discrimination. At act 1540, it is assessed if the predetermined period elapsed. In the affirmative case, public access to public service is revoked. In an aspect, revocation can be implemented through removal of the "Public" logic flag.

The owner or lessee of the access point that is configured for public access can received compensation as a result of implementation of example method 1500. Compensation can be provided by a telecommunication carrier that administers wireless service(s) that is supplied via the access point configured for public access.

Figure 16:
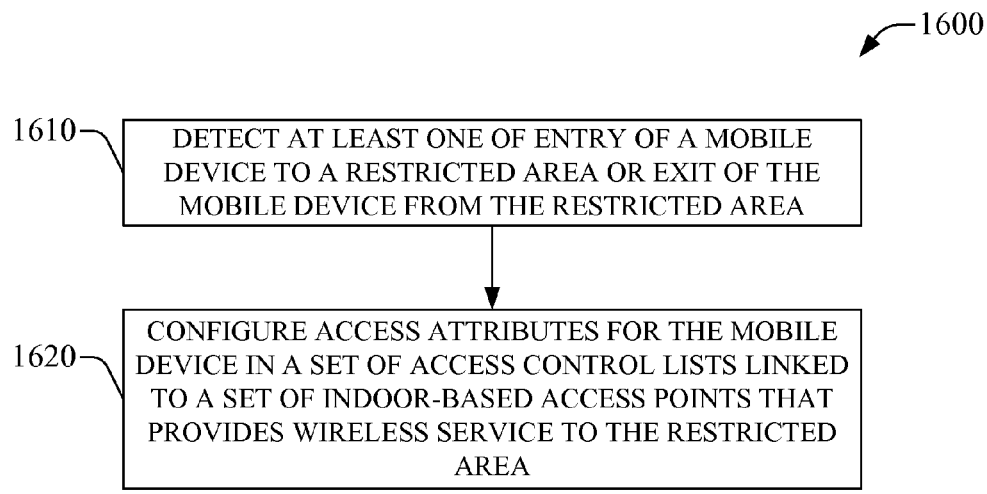
FIG. 16 displays a flowchart of an example method for supplying access to wireless service in a restricted area according to features described herein.

FIG. 16 displays a flowchart of an example method 1600 for supplying access to wireless service in a restricted area according to features described herein. One or more access points that serve the restricted area provide the wireless service. In an illustrative scenario, the restricted area can be a mobile enclosure, such as a train cart or locomotive, subway cart, an elevator, or the like. The subject example method can be implemented by a management component or component(s) therein that can reside within the access point or be external thereto. Alternatively or additionally, one or more processors can enact the subject example method 1600; the one or more processors can be configured to provide or can provide, at least in part, functionality to the management component or one or components therein. Further, one or more processors that execute the management component (manager component 120) or component(s) therein, or a set of code instructions that implement the management component or component(s) therein and their functionality also can enact the subject example method.

At act 1610, at least one of entry of a mobile device to the restricted area or exit of the mobile device from the restricted area is detected. Detection can be based at least in part on reference data or updates thereof. For example, the reference data can include location information supplied by the mobile device; presence information retained in a presence server (e.g., server(s) 162) linked to the management component; information associated with access credential(s), e.g., ticket registration information; or the like.

At act 1620, access attributes for the mobile device are configured in a set of access control lists linked to a set of access points that provides wireless service to the restricted area. The set of ACLs is associated in a one-to-one relationship with the set of indoor-based APs (see, e.g., FIG. 3 and associated description).

Figure 17:
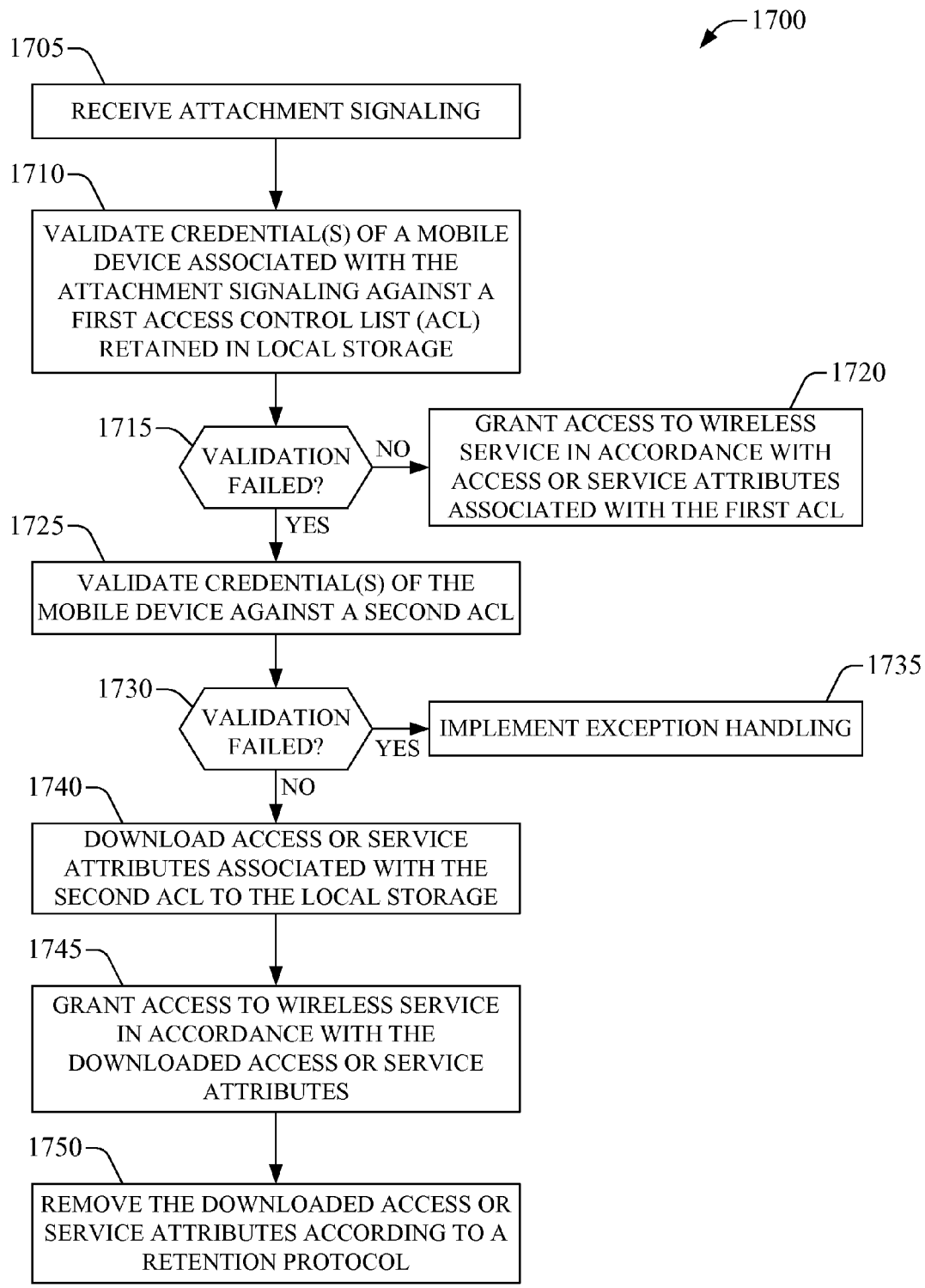
FIG. 17 displays a flowchart of an example method for generating a local data cache of at least one of access or service attributes according to features described herein.

FIG. 17 displays a flowchart of an example method 1700 for generating a local data cache of at least one of access or service attributes according to features described herein. One or more access points that serve the restricted area provide the wireless service. In an illustrative scenario, the restricted area can be a mobile enclosure, such as a train car or locomotive. The subject example method can be implemented by a management component (e.g., manager component 120) or component(s) therein that can reside within the access point or be external thereto. Alternatively or additionally, one or more processors can enact the subject example method 1700; the one or more processors can be configured to provide or can provide, at least in part, functionality to the management component or one or components therein. Further, one or more processors that execute the management component (manager component 120) or component(s) therein, or a set of code instructions that implement the management component or component(s) therein and their functionality also can enact the subject example method. At act 1705, attachment signaling is received. At act 1710, credential(s) of a mobile device associated with the attachment signaling are validated against a first access control list (ACL) retained in local storage, which can be part of an access point that receives the attachment signaling. At act 1715, it is determined if the validation fails. In the negative case, at act 1720, access to wireless service is granted in accordance with access attributes of the first ACL and service attributes associated therewith. Conversely, if validation fails, credential(s) of the mobile device are validated against a second ACL at act 1725. The second ACL can be retained in a centralized component or system. At act 1730, it is determined if the second validation fails. In the negative case, exception handling is implemented at act 1735. Conversely, in the positive case, access or service attributes associated with the second ACL are downloaded at act 1740. At act 1745, access to wireless service is granted in accordance with the downloaded access or service attributes. At act 1750, the downloaded access or service attributes are removed according to a retention protocol. In an aspect, the retention protocol can dictate at least one of instances or conditions in which downloaded data is to be flushed.

Figure 18:
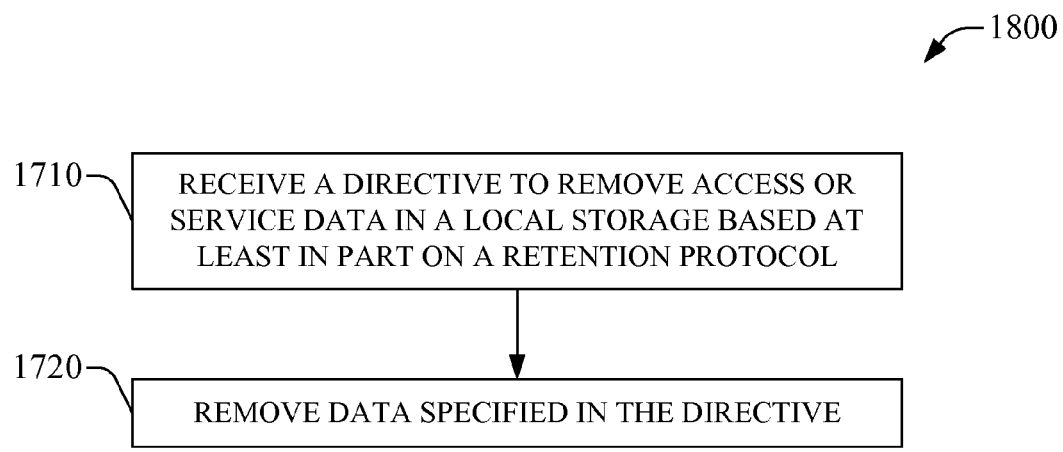
FIG. 18 is a flowchart of an example method to flush a local data cache of at least one of access attributes or service attributes according to aspects of the subject innovation.

FIG. 18 is a flowchart of an example method 1800 to flush a local data cache of at least one of access attributes or service attributes according to aspects of the subject disclosure. The local data cache of at least one of access attributes or service attributes can be provisioned as described in example method 1800. The subject example method can be implemented by a management component or component(s) therein that can reside within the access point or be external thereto. Alternatively or additionally, one or more processors can enact the subject example method 1800; the one or more processors can be configured to provide or can provide, at least in part, functionality to the management component or one or components therein. Further, one or more processors that execute the management component (manager component 120) or component(s) therein, or a set of code instructions that implement the management component or component(s) therein and their functionality also can enact the subject example method. At act 1810, a directive is received to remove access or service data in a local storage (e.g., local memory $314_\lambda$) based at least in part on a retention protocol, which can be statically or dynamically configured. In an aspect, the retention data protocol can include a schedule of instants at which the local data cache is flush, e.g., data therein are removed. In another aspect, the indication can be embodied, for example, in one or more reserved bits in a packet header, a light-payload (e.g., of the order of 1 byte) data packet, a predetermined multi-bit word conveyed in a control channel, a light-payload file (e.g., a cookie file), an email communication, an instant message, or the like. At act 1820, data specified in the directive is removed.

Figure 19:
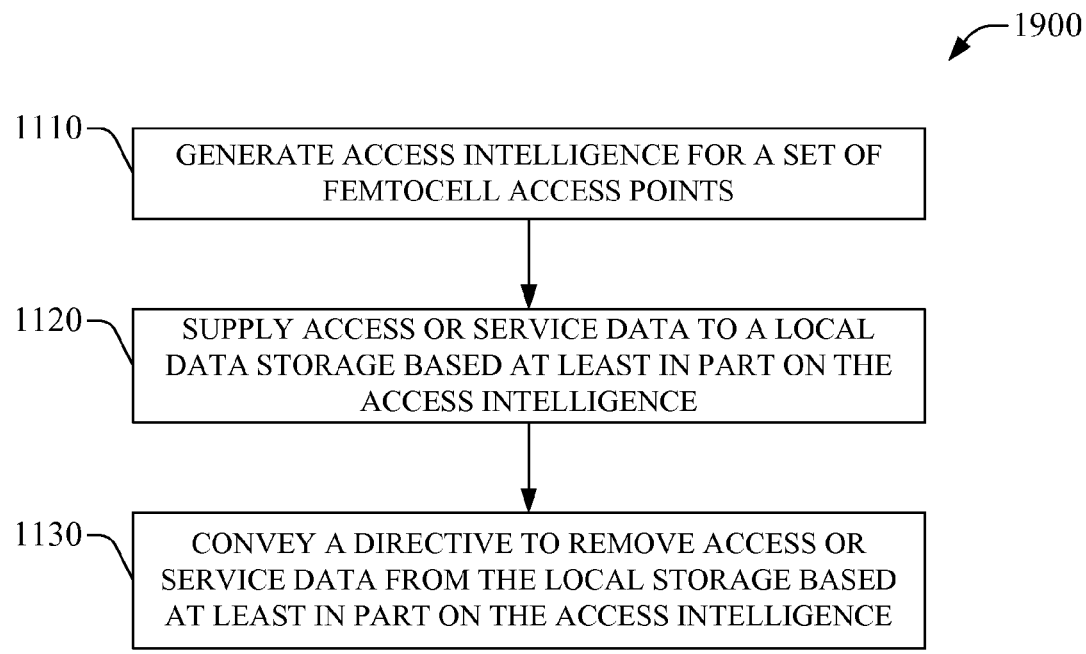
FIG. 19 is a flowchart of an example method for supplying a local data cache of at least one of access attributes or service attributes according to aspects of the subject innovation.

FIG. 19 is a flowchart of an example method 1900 for supplying a local data cache of at least one of access attributes or service attributes according to aspects of the subject disclosure. In an aspect, the local data cache is supplied autonomously. The subject example method can be implemented by a management component or component(s) therein that can reside within an access point that retains the local data cache or be external to the access point. Alternatively or additionally, one or more processors can enact the subject example method 1900; the one or more processors can be configured to provide or can provide, at least in part, functionality to the management component or one or components therein. Further, one or more processors that execute the management component (manager component 120) or component(s) therein, or a set of code instructions that implement the management component or component(s) therein and their functionality also can enact the subject example method. At act 1910, access intelligence is generated for a set of access points. As described supra, the access points can be indoor-based base stations or outdoor-based base stations. Access intelligence can be generated through aggregation of attachment signaling linked to one or more APs in the set of access points. Access intelligence can be generated as described supra (see, e.g., FIGS. 6-7, and associated descriptions). At act 1920, access or service data is supplied to a local data storage (e.g., local memory $314_\lambda$) based at least in part on the access intelligence. The local data storage is linked to an access point (e.g., $310_\lambda$). At act 1930, a directive to remove access or service data from the local data storage based at least in part on the access intelligence is conveyed. Such directive is conveyed to the access point in act 1920.

Figures 20A, 20B:
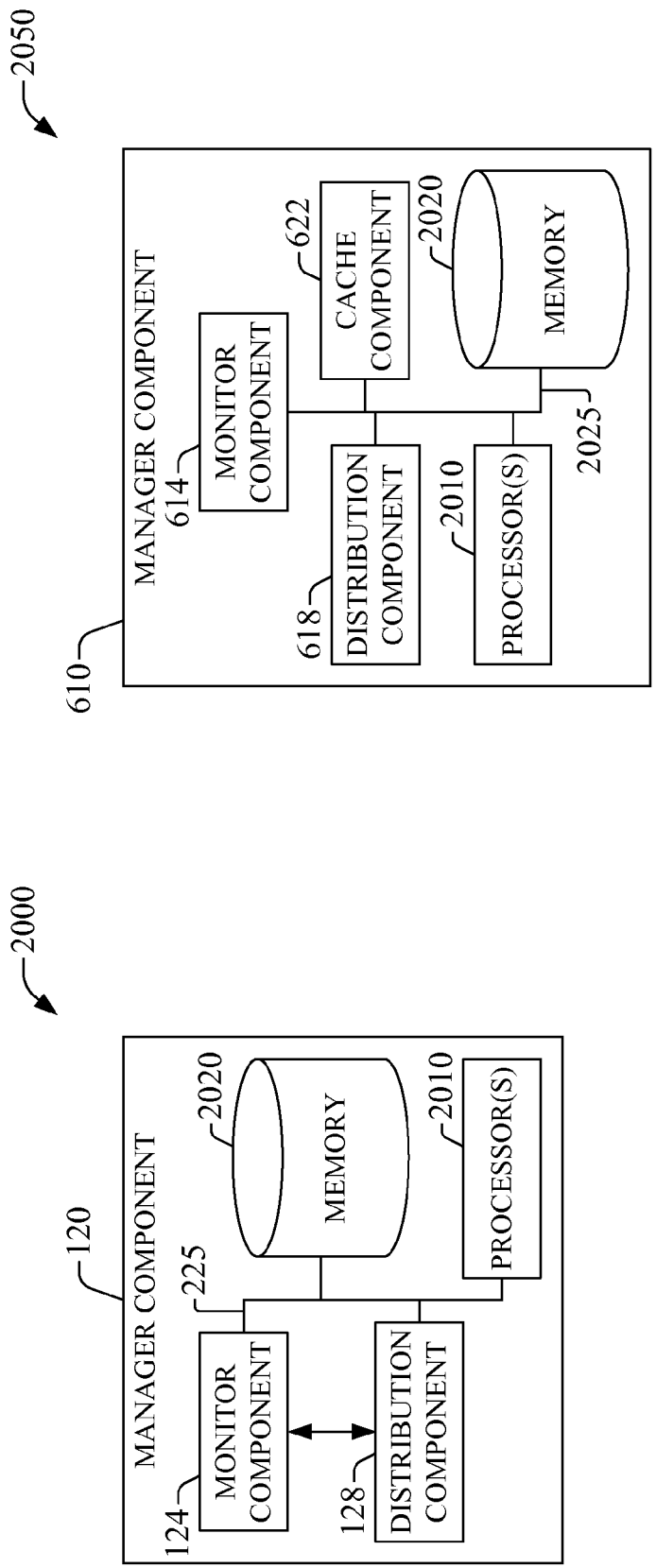
FIGS. 20A-20B display block diagrams of example embodiments of a manager component in accordance with aspects described herein.

FIGS. 20A-20B display block diagrams of example embodiments of a manager component in accordance with aspects described herein. In diagram 2000, in an aspect, to provide described functionality of manager component 120, processor(s) 2010 can exploit bus 2025 to exchange data or any other information amongst component(s) f manager component 120 and memory 2020 or elements therein, such as admin. rule(s) 134. Bus 2025 can be embodied in at least one of a memory bus, a system bus, an address bus, a message bus, a reference link, or any other conduit, protocol, or mechanism for data or information exchange among component(s). Such information can include at least one of code instructions, code structure(s), data structures, or the like. Processor(s) 2010 also can execute code instructions (not shown) stored in memory 2020 to implement or provide at least part of the described functionality of manager component 120 or components therein. Such code instructions can include program modules or software or firmware applications that implement specific tasks which can be accomplished through one or more of the example methods described in the subject specification and that are associated, at least in part, with functionality of various example systems (e.g., 100, 300, 400 . . . ) described herein in which manager component 120 can be a part of. In one or more alternative or additional embodiment(s), processor(s) 2010 can reside within a component of manager component 120 or be distributed amongst a plurality of components of manager component 120 to provide described functionality thereof. Further, in some alternative or additional embodiments, components that are part of manager component 120 can reside within memory 2020 as one or more sets of code instructions that, when executed by processor(s) 2010, implement each of such components and described functionality thereof. Memory 2020 can be a centralized element or a distributed element, and can include any memory element described in connection with the various examples systems set forth herein. Manager component 120 also can include I/O interface(s) (not shown) that enable communication with external components or systems.

In diagram 2050, processor(s) 2010, memory 2020, and bus 2025 provide at least part of the functionality of manager component 610 and components therein. processor(s) 2010 can exploit bus 2025 to exchange data or any other information amongst component(s) of manager component 610 and memory 2020 or elements therein. Processor(s) 2010 also can execute code instructions (not shown) stored in memory 2020 to implement or provide at least part of the described functionality of manager component 120 or components therein. Such code instructions can include program modules or software or firmware applications that implement specific tasks which can be accomplished through one or more of the example methods described in the subject specification and that are associated, at least in part, with functionality of various example systems (e.g., 100, 300, 400 . . . ) described herein in which manager component 610 can be a part of. In one or more alternative or additional embodiment(s), processor(s) 2010 can reside within a component of manager component 610 or be distributed amongst a plurality of components of manager component 610 to provide described functionality thereof. Further, in some alternative or additional embodiments, components that are part of manager component 610 can reside within memory 2020 as one or more sets of code instructions that, when executed by processor(s) 2010, implement each of such components and described functionality thereof. Manager component 610 also can include I/O interface(s) (not shown) that enable communication with external components or systems.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through code instructions, or program modules, stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femtocell access point(s) and associated coverage, such aspects or features also can be exploited in indoor-based access point(s) that provide wireless coverage through substantially any or any disparate telecommunication technologies, such as for example Wi-Fi (wireless fidelity) or picocell telecommunication. In addition, aspects, features, or advantages of the subject disclosure also can be exploited in macrocellular base station(s). Moreover, aspects, features, or advantages of the subject disclosure can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Furthermore, substantially all aspects of the subject disclosure can include legacy telecommunication technologies.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. An access point device, comprising:
a memory to store instructions; and
a processor, communicatively coupled to the memory, that facilitates execution of the instructions to perform operations, comprising:
receiving a first access control data structure, wherein the first access control data structure is utilized by the access point device to control access to a network;
storing the first access control data structure;
validating a credential of a mobile device requesting establishment of attachment signaling with the access point device, wherein the validating is performed utilizing a first criterion in the first access control data structure;
in response to the credential of the mobile device failing the validating with reference to the first criterion in the first access control data structure, forwarding the credential of the mobile device to a second access control data structure, wherein the second access control data structure is not stored on the access point device;
receiving from a data store comprising the second access control data structure, an indication of successfully validating the credential of the mobile device with a second criterion in the second access control data structure;
in response to successfully validating the credential of the mobile device with the second criterion, downloading the second criterion from the data store based on the second access control data structure; and
updating the first access control data structure with the second criterion.

2. The access point device of claim 1, wherein the operations further comprise:
tracking an operational condition of the access point device; and
in response to determining a change has occurred in the operational condition of the access point device, updating the first access control data structure based on the change in the operational condition of the access point device.

3. The access point device of claim 2, wherein the tracking of the operational condition is performed in accordance with a polling schedule.

4. The access point device of claim 1, wherein the first criterion is based on a level of service attribute identifying a service level provided by the network.

5. The access point device of claim 1, wherein the second criterion is based on an access attribute identifying unrestricted attachment signaling for a duration defined for public access.

6. The access point device of claim 5, wherein the access attribute is a predetermined schedule.

7. The access point device of claim 5, wherein the operations further comprise:
receiving from the remotely located second access control data structure, a third criterion in the second access control data structure, wherein the third criterion indicating that the duration defined as public access has expired; and
in response to determining attachment signaling of the mobile device to the access point device is a public access, terminating the attachment signaling of the mobile device to the access point device.

8. The access point device of claim 1, wherein the second criterion is generated based on a probability determined of an attachment event occurring at the access point device.

9. The access point device of claim 1, wherein the operations further comprise:
defining a period of time for retaining the second criterion in the first access control data structure; and
in response to the period of time being determined to have elapsed, removing the second criterion from the first access control data structure.

10. A method, comprising:
receiving, by an access point device comprising a processor, a first access control data structure, wherein the first access control data structure is utilized by the access point device to control access to a network;
storing, by the access point device, the first access control data structure;
initiating, by the access point device, a potential validation of a credential of a mobile device determined to be attempting to establish attachment signaling with the access point device, wherein the credential is to be validated with reference to a first criterion in the first access control data structure;
in response to determining that the potential validation has failed with reference to the first criterion based on the credential of the mobile device, forwarding, by the access point device, the credential to a second access control data structure, wherein the second access control data structure is located remotely from the access point device;
receiving, by the access point device, from a remote data store comprising the second access control data structure, an indication of a successful validation of the credential of the mobile device with reference to a second criterion in the second access control data structure;
in response to the receiving the indication of the successful validation, receiving, by the access point device, the second criterion from the second access control data structure; and
modifying, by the access point device, the first access control data structure to comprise the second criterion.

11. The method of claim 10, further comprising:
monitoring, by the access point device, an operating condition of the access point device; and
in response to determining a change has occurred in the operating condition of the access point device, updating, by the access point device, the first access control data structure based on the change in the operating condition of the access point device.

12. The method of claim 10, wherein the first criterion relates to an access requirement defined for the network.

13. The method of claim 10, further comprising:
generating, by the access point device, a time-stamp of a defined duration for the attachment signaling;
determining, by the access point device, whether the time-stamp is still current according to the defined duration of the time-stamp; and
in response to the time-stamp being determined to be no longer current, denying, by the access point device the attachment signaling.

14. The method of claim 10, wherein the second criterion identifies unrestricted attachment signaling for a duration defined for public access.

15. The method of claim 14, further comprising:
receiving, by the access point device from the data store comprising the second access control data structure, a third criterion from the second access control data structure, wherein the third criterion indicates that the duration defined for public access has expired; and
in response to determining the attachment signaling of the mobile device to the access point device is classified for public access, terminating the attachment signaling of the mobile device to the access point device with reference to the third criterion.

16. The method of claim 14, wherein the second criterion is active based on a predetermined schedule.

17. The method of claim 10, wherein the initiating includes initiating, by the access point device, the validating of the credential of the mobile device, in response to detecting the mobile device within a transmission range of the access point device.

18. The method of claim 17, wherein the transmission range of the access point device is limited to a restricted area.

19. The method of claim 10, further comprising:
defining, by the access point device, a period of time for retaining the second criterion in the first access control data structure; and
in response to the period of time expiring, removing, by the access point device, the second criterion from the first access control data structure.

20. A tangible computer readable medium comprising computer executable instructions that, in response to execution, cause an access point device comprising a processor to perform operations, the operations comprising:
receiving a first access control data structure, wherein the first access control data structure is utilized by the access point device to control access to a network;
storing the first access control data structure;
validating a credential of a mobile device attempting to establish attachment signaling with the access point device, wherein the validating is performed with reference to a first criterion in the first access control data structure;
in response to failure to validate the credential of the mobile device with the first criterion in the first access control data structure, forwarding the credential of the mobile device to a second access control data structure, wherein the second access control data structure is stored remotely from the access point device;
receiving from the remotely located second access control data structure, an indication of successfully validating the credential of the mobile device with a second criterion in the second access control data structure;
in response to successfully validating the mobile device credential with the second criterion, downloading the second criterion from the second access control data structure; and
updating the first access control data structure with the second criterion.

21. The tangible computer readable medium of claim 20, wherein the operations further comprise:
defining a period of time for retaining the second criterion in the first access control data structure; and
in response to the period of time being determined to expire, removing the second criterion from the first access control data structure.

22. The tangible computer readable medium of claim 20, wherein the operations further comprise:
monitoring an operating condition of the access point device; and
in response to determining a change has occurred in the operating condition of the access point device, updating the first access control data structure based on the change.

* * * * *